(12) United States Patent
Gwin

(10) Patent No.: US 10,766,617 B2
(45) Date of Patent: Sep. 8, 2020

(54) METHODS AND APPARATUS TO GRASP AN OBJECT WITH AN UNMANNED AERIAL VEHICLE

(71) Applicant: Intel Corporation, Santa Clara, CA (US)

(72) Inventor: Paul Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 15/811,098

(22) Filed: Nov. 13, 2017

(65) Prior Publication Data
US 2019/0047696 A1 Feb. 14, 2019

(51) Int. Cl.
| B64C 39/02 | (2006.01) |
| B64D 1/02 | (2006.01) |
| B25J 15/00 | (2006.01) |
| B25J 9/10 | (2006.01) |
| F03G 7/00 | (2006.01) |

(52) U.S. Cl.
CPC .......... *B64C 39/024* (2013.01); *B25J 9/1085* (2013.01); *B25J 9/1095* (2013.01); *B25J 15/00* (2013.01); *B25J 15/0028* (2013.01); *B64D 1/02* (2013.01); *F03G 7/00* (2013.01); *B64C 2201/18* (2013.01); *C08G 2280/00* (2013.01)

(58) Field of Classification Search
CPC .. B64C 39/024; B64C 2201/18; B25J 9/1085; B25J 9/1095; B25J 15/00; B25J 15/0028; B64D 1/02; F03G 7/00; C08G 2280/00
See application file for complete search history.

(56) References Cited

U.S. PATENT DOCUMENTS

| 2005/0272211 A1* | 12/2005 | Browne | B60J 10/00 438/296 |
| 2009/0095865 A1* | 4/2009 | Everhart | B60N 3/105 248/309.1 |
| 2016/0364989 A1* | 12/2016 | Speasl | B64C 39/024 |
| 2017/0200530 A1* | 7/2017 | Davis | H01B 7/28 |
| 2018/0257774 A1* | 9/2018 | Volpi | B25J 11/00 |

* cited by examiner

*Primary Examiner* — Rodney A Bonnette
(74) *Attorney, Agent, or Firm* — Hanley, Flight & Zimmerman, LLC

(57) ABSTRACT

Methods and apparatus to grasp an object with an unmanned aerial vehicle are described herein. An example unmanned aerial vehicle includes a gripper having a claw to grasp onto an object and an active material disposed on the claw. The example unmanned aerial vehicle further includes a material activator to: (1) apply an activation signal to the active material to soften the active material while the claw grasps the object with the active material, and (2) allow the active material to harden in a shape substantially matching a surface of the object.

20 Claims, 8 Drawing Sheets

METHODS AND APPARATUS TO GRASP AN OBJECT WITH AN UNMANNED AERIAL VEHICLE

FIELD OF THE DISCLOSURE

This disclosure relates generally to unmanned aerial vehicles, and, more particularly, to methods and apparatus to grasp an object with an unmanned aerial vehicle.

BACKGROUND

Unmanned aerial vehicles (UAVs), commonly referred to as drones, are becoming more readily available and have developed into a rapidly growing market. UAVs are now being used in a wide variety of industries, such as farming, shipping, forestry management, surveillance, disaster scenarios, gaming, etc. UAVs typically include one or more batteries to power the motors and other electronics on the UAV.

Figure 1:
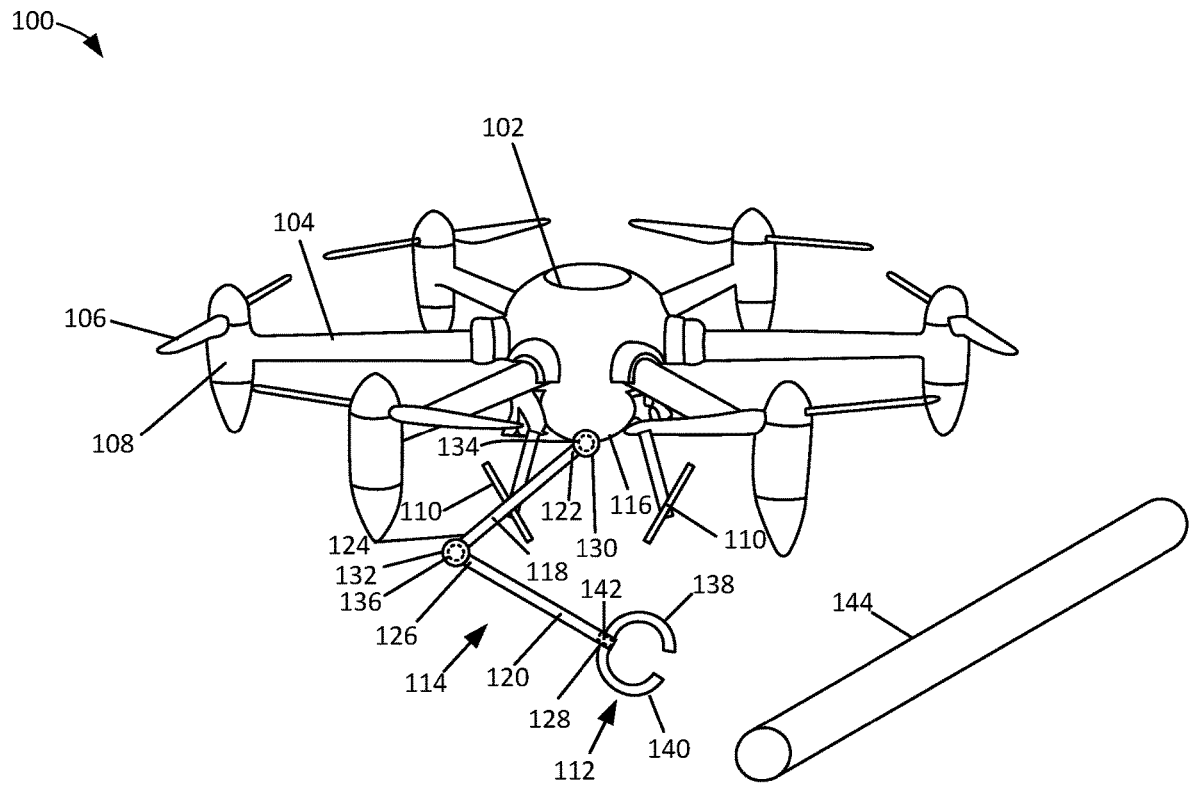
FIG. 1 illustrates an example unmanned aerial vehicle (UAV) constructed in accordance with the teachings of this disclosure and having an example gripper that may be used to grip an object.

The figures are not to scale. Instead, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part (relative to the Earth surface) with one or more intermediate part(s) located therebetween. Stating that any part is in contact with another part indicates that there is no intermediate part between the two parts.

DETAILED DESCRIPTION

A rotorcraft, sometimes referred to as a non-fixed wing aircraft or rotary-wing aircraft, is an aircraft that uses lift generated by one or more propellers or rotor blades. For example, a rotorcraft may include one or multiple rotor blades (e.g., rotor assemblies) mounted on a single mast or multiple masts. Rotorcrafts are a common type of unmanned aerial vehicle (UAV) that use multiple rotor blades, referred to herein as a multi-rotor rotorcraft. For example, a quad-copter UAV is a multi-rotor rotorcraft that generates lift via four rotor blades.

Rotorcraft UAVs are a rapidly growing market and are now being used in all aspects of our world such as for farming, filming and photography, shipping, gaming, etc. UAVs typically include a battery to power the rotor blade motors and other electronics (e.g., a camera). While battery technology has increased over the past several years, UAVs are still significantly limited in flight time and range because of battery capabilities. For instance, most rotorcraft UAVs only have a battery life of about 10-45 minutes. When the battery charge is depleted, the UAV must land and the battery must be recharged and/or replaced with a new battery. Depending on the mission of the UAV, this process can severely limit the capabilities of the UAV.

Disclosed herein are example methods, apparatus, and articles of manufacture that enable an aircraft, such as a rotorcraft UAV, to grasp onto an object suspended above the ground and reduce or cease power to one or more systems of the UAV to conserve battery power. For instance, often times it is desired to keep a UAV hovering in a particular area or around a particular area for an extended period of time. For example, the UAV mission may include filming a particular scene or event for a period of time. Due to battery constraints, as explained above, the UAV would normally be required to land once the battery charge depleted. Instead, example methods, apparatus, and article of manufacture disclosed herein enable the UAV to securely latch onto or perch on an above-ground object, such as a tree branch, a rod or rail extending from a building or tower, etc. Once secured to the object, the rotor blade motors and/or other systems of the UAV can be deactivated to conserve battery power. In some examples, one or more systems, such as a camera, may continue to be operable while the UAV is perched. As such, the UAV may continue with the mission (e.g., filming) while also reducing power consumption (e.g., shutting down the lift system). As used herein, the terms "perch," "perching," "perched," and/or other variations thereof, are defined to mean a process or position where an aircraft (e.g., a UAV) attaches to a structure (typically a vertical distance above ground) and is supported by the structure for a period of time.

Disclosed herein are example UAVs and example clamps or grippers that can be carried by example UAVs and used to grasp an object for perching. In some examples, the gripper includes two claws (e.g., jaws) that open and close, via a gripper actuator, to engage an object. In some examples, the gripper is carried on an end of a movable arm. For example, the moveable arm may be coupled to a bottom of the UAV and used to move the gripper to various positions relative to a body of the UAV. The gripper and/or arm may be used to position the UAV in a perched position, such as off to the side of the object, above the object, etc. Once the gripper is closed onto the object, one or more systems of the UAV, such as the lift system (e.g., the flight control system and/or rotor blade motors), can be deactivated to conserve battery power. The rotor blades may start rotating prior to release of the gripper, simultaneous to release of the gripper, or after release of the gripper. Then, when it is desired to move the UAV, the gripper can open to release the object and the rotor blade motors can reactive to fly away. Also, in addition to or as an alternative to perching the UAV with the gripper, the gripper may be used to grab and carry an object.

Also disclosed herein are example methods, apparatus, and articles of manufacture that enable a gripper of a UAV to conform to a shape or geometry of an object, such as an object being grasped for perching. In particular, disclosed herein are example grippers having active materials coupled to the gripper, such as on an inner surface of the gripper. An active material is a material that undergoes a change in modulus in response to an activation signal. Depending on the particular type of active material, different activation signals may be used to activate the active material, thereby enabling the active material to change shape (e.g., deform). The activation signal may be, for example, application of an electric current or voltage, a temperature change, ultraviolet light, a magnetic field, a mechanical loading or stressing, etc.

An example active material that may be used with an example gripper is a shape-memory polymer (SMP) material. As disclosed in further detail herein, SMP materials are designed to have a primary, original, or global shape (e.g., the primary shape may be a generally rigid starting and/or default shape that is generally fixed unless subjected to a particular condition). When heated to a temperature above a threshold temperature such as, for example, a glass transition temperature ($T_g$), the modulus of the SMP material reduces and the material becomes deformable (referred to herein as a deformable state). The material may then be bent and/or otherwise deformed into another shape (which may become an adjusted or secondary shape). For example, the gripper may be closed onto an object, such that the material engages the outside of the object and conforms to a matching shape or geometry. Then, when the temperature is reduced below the threshold temperature (e.g., the glass transition temperature $T_g$), the modulus increases and the material hardens to the shape in which the material is constrained, referred to as the adjusted or secondary shape. This transition enables the active material to harden into an adjusted shape or geometry that more closely matches the object being grasped by the gripper. As such, the active material creates better contact or grip between the gripper and the object and, thus, reduces potential slippage and/or unwanted movement (limiting precise and stable position) that may otherwise occur between the object and the gripper on the primary shape, especially for object shapes that do not match the primary/original shape of the gripper. This enhanced gripping capability provides better stabilization for holding the UAV in a perched position, for example, which may be useful in adverse environmental conditions such as wind. Further, with better gripping capabilities, the UAV can remain perched for a longer period of time, which further enables the UAV to conserve power. Moreover, because maintaining the secondary shape does not require energy, the enhanced gripping can be sustained for periods of time without reducing power reserves.

When the gripper is to be opened and the object is to be released, heat (or another form of activation signal) may be applied to the active material again, which causes the active material to, if unconstrained, morph back to its primary shape. This process can be repeated over-and-over with the same object or different objects. Thus, the example gripper can advantageously adapt to a wide range of different objects without any structural change to the gripper. Instead, the active material morphs to fit the object to be gripped. In other examples, other types of active materials may be utilized, such as a shape-memory alloy (SMA) (also referred to as a smart memory alloy) (e.g., nitiniol) or an electroactive polymer (EAP).

Turning now to the figures, FIG. 1 illustrates an example UAV 100 with which the examples disclosed herein may be implemented. The UAV 100 includes a body 102, a plurality of booms 104 (one of which is referenced in FIG. 1) extending outward from the body 102, and a rotor blade 106 disposed at the end of each of the booms 104. The rotor blades 106 (one of which is referenced in FIG. 1) are driven by respective motors 108 (one of which is referenced in FIG. 1) to generate lift and fly the UAV 100. In the illustrated example, the UAV 100 also includes two legs or feet 110 for supporting the UAV 100 on a surface, such as the ground, in a resting state. In the illustrated example of FIG. 1, the UAV 100 is a six-rotor UAV, sometimes referred to as a hexacopter. However, in other examples, the UAV 100 may be implemented as another type of UAV having more or fewer rotors (e.g., a quadcopter). The example UAV 100 may be controlled via commands or instructions from a remote controller, for example, and/or may be controlled via autonomous flight instructions. The example UAV 100 may be used for any purpose, such as surveillance, delivery services, recreation, etc.

To grasp onto an object (e.g., for perching the UAV 100 or for carrying an object), the example UAV 100 includes a gripper 112 (e.g., a clamp). In the illustrated example, the gripper 112 is carried on an end of a moveable arm 114 that is coupled to the body 102. The arm 114 is moveable to position the gripper 112 in one or more different locations relative to the body 102. In the illustrated example, the arm 114 is coupled to and extends from a bottom 116 of the body 102. However, in other examples, the arm 114 may be coupled to the side of the body 102 or the top of the body 102.

In the illustrated example, the arm 114 includes a first arm link 118 and a second arm link 120. The first arm link 118 has a first end 122 and a second end 124 opposite the first end 122, and the second arm link 120 has a first end 126 and a second end 128 opposite the first end 126. The first end 122 of the first arm link 118 is rotatably coupled to the body 102 at a first joint 130 (e.g., a hinge), and the first end 126 of the second arm link 120 is rotatably coupled to the second end 124 of the first arm link 118 at a second joint 132. The gripper 112 is coupled to and carried at the second end 128 of the second arm link 120. In the illustrated example, the arm 114 includes a first arm actuator 134 (shown in dashed lines) to rotate the first arm link 118 about the first joint 130 and a second arm actuator 136 (shown in dashed lines) to rotate the second arm link 120 about the second joint 132. The first and second arm actuators 134, 136 may be actuated to move the first and second arm links 118, 120 and, thus, move the gripper 112 to a desired position. In some examples, the arm 114 includes an additional joint and/or actuator at the second end 128 of the second arm link 120 to rotate the gripper 112 relative to the second arm link 128, thereby providing an additional degree of freedom. In some examples, in addition to being rotatable about the first joint 130 (e.g., a horizontal axis), the first arm link 118 may also be rotatable about an axis extending through the UAV 100 (e.g., a vertical axis) to enable the arm 114 to spin.

In some examples, using an arm having two or more moveable arm links (e.g., portions), such as the arm 114, enables the arm to move between a stored or stowed position in which the arm 114 and/or the gripper 112 are disposed relatively close to the body 102 and an extended position where the gripper 112 is disposed relatively far or outward from the body 102. For example, when flying, the arm 114 can be folded or arranged close to the body 102 to reduce drag and avoid hitting any objects and, when it is desirable to grasp or otherwise engage an object, the arm 114 can be extended to dispose the gripper 112 outward from the body 102 to grasp or otherwise engage the object.

In the illustrated example, the arm 114 has a length such that when the arm 114 is fully extended in a horizontal direction, the gripper 112 is disposed outside of a circumference of the rotor blades 106. In some examples, disposing the gripper 112 outside of the circumference of the rotor blades 106 ensures the rotor blades 106 are spaced from the object being grasped by the gripper 112. In other examples, the first and/or second arm links 118, 120 may be longer or shorter such that the gripper 112 is disposed closer to or further from the body 102.

Figure 2:
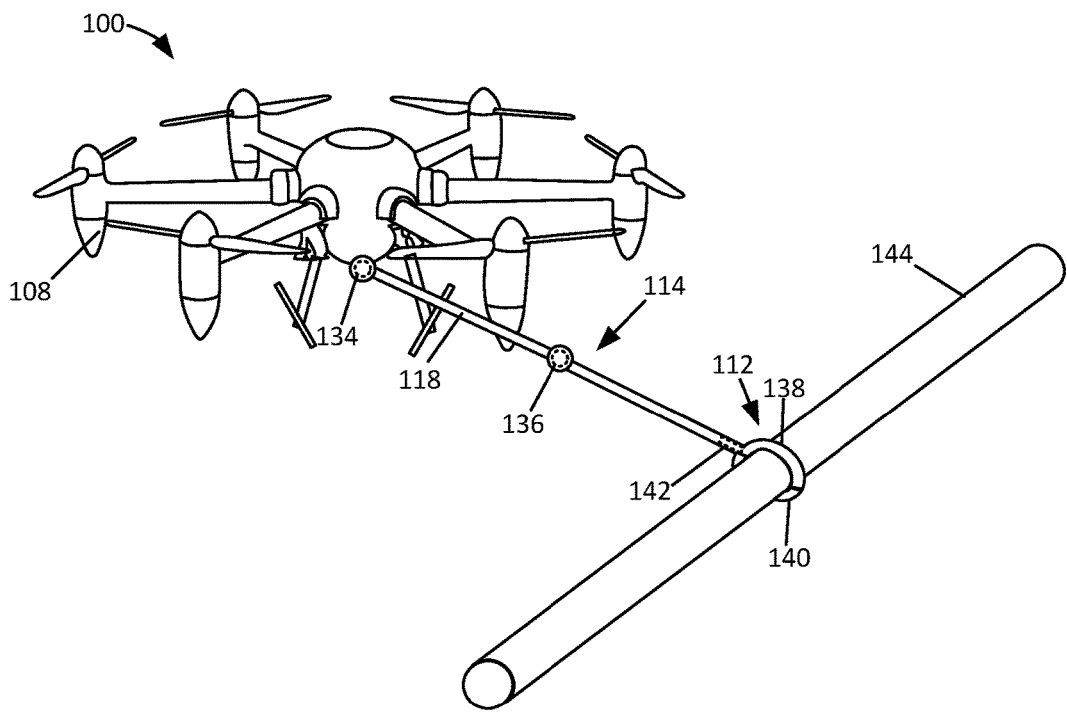
FIG. 2 shows the example UAV of FIG. 1 using the example gripper to perch on the object for a period of time.

In the illustrated example, the gripper 112 includes two claws (e.g., fingers, jaws), a first claw 138 and a second claw 140, that are moveable toward and away from each other via a gripper actuator 142. In particular, the first and second claws 138, 140 are cooperatively moveable (in opposite directions) between an open position, as shown in FIG. 1, and a closed position, as shown in FIG. 2 and disclosed in further detail herein. In the illustrated example of FIG. 1, the first claw 138 and the second claw 140 are arc-shaped (e.g., C-shaped) and form a substantially closed ring or loop when closed. In other examples, the first and second claws 138, 140 are laterally offset such that their ends do not meet when closed (e.g., like a bird claw). Also, in other examples, the first claw 138 and/or the second claw 140 may be straight (e.g., parallel to each other) and/or shaped differently than the curved shape depicted. The gripper 112 may be used to grasp onto an object, such as the example object 144 illustrated in FIG. 1. In particular, in some examples, the gripper 112 may be used to grasp the object 144 for perching or supporting the UAV 100. Additionally or alternatively, the gripper 112 may be used to grasp the object 144 for transporting the object 144 via the UAV 100. In the illustrated example, the object 144 is depicted as a pole or rod in a horizontal orientation. However, the object 144 may be any moveable or fixed object or structure, such as a box, a box handle, a power line, a tree branch, a rod extending from a building or other tower, any and/or other structure capable of being grasped by the gripper 112. For instance, it may be desirable to keep the UAV 100 in a same location during a mission. For example, the UAV 100 may be filming a scene for an extended period of time from the same overhead location. Instead of using battery power to hover the UAV 100 in the same location, the example gripper 112 enables the UAV 100 to grasp onto a fixed object, such as a tree branch or rod extending from a building (e.g., a flag pole, railing, buttress, etc.), and rest for a period of time without operating the motors 108.

For example, assume the object 144 is a rigid or semi-rigid structure that can support the weight of the UAV 100. As illustrated in FIG. 2, the gripper 112 may be used to grasp onto the object 144 for supporting the UAV 100 above the ground. In particular, in the illustrated example, the first and second claws 138, 140 have been closed onto the object 144. In the illustrated example, the gripper 112 is orientated such that the first claw 138 is adjacent and/or engages a top side of the object 144 and the second claw 140 is adjacent and/or engages a bottom side of the object 144. The gripper actuator 142 may actuate the first and second claws 138, 140 to close onto the object 144 with sufficient pressure to support the weight of the UAV 100. The example perching process may be performed automatically as part of a perching operation, for example, and/or may be performed manually by a user controlling the UAV 100 (e.g., a user may manually trigger the arm actuators 134, 136 and/or the gripper actuator 142). In some examples, to enhance the gripping capability of the gripper 112, one or more active materials may be utilized on the inner surfaces of the first and second claws 138, 140 that conform to the contour or shape of the object and increase the frictional force needed to create a sufficient grip for perching the UAV 100. The use of an active material enables the gripper 112 to securely perch the UAV 100 on irregularly shaped structures and/or structures having a cross-sectional dimension too small to permit the gripper 112 to hold securely without the active material. Example active materials are disclosed in further detail herein.

Using the gripper 112 to hold the UAV 100 in the perched position enables the UAV 100 to conserve battery power by deactivating or reducing power supplied to one or more systems of the UAV 100, such as the motors 108 and/or other flight control system components. For example, after the gripper 112 has secured the UAV 100 to the object 144, the motors 108 may be deactivated, which significantly reduces power consumption. In some examples, once the UAV 100 is secured to the object 144, the UAV 100 may be switched into a different mode that automatically deactivates or reduces power to one or more systems. For example, the UAV 100 may be switched to a rest mode, where the motors 108 and/or other flight control system components are deactivated. In other examples, the UAV 100 may be switched to a sleep or power down mode where substantially all power to all of the systems is stopped. In some such examples, only a receiver (e.g., the transceiver 302 of FIG. 3) of the UAV 100 remains active to monitor for a signal or instruction to reactive the motors 108. In some examples, even the receiver is powered down to a sleep mode and wakes up periodically to check for a command.

In some examples, after the first and second claws 138, 140 are closed onto and/or adjacent the object 144, the arm actuators 134, 136 and/or the gripper actuator 142 may be deactivated and/or locked in position, which may help to further reduce energy consumption. In some examples, the arm 114 and the gripper 112 are static in their power-down state (e.g., via resistance from the gripper actuator motor). As such, the arm 114 and the gripper 112 retain their positions or states after deactivation to hold the UAV 100 in a fixed position relative to the object 144. In other examples, the UAV 100 may include one or more locks or latches (e.g., solenoids) that may be activated to lock the arm 114 and/or the gripper 112 in position (e.g., lock the gripper 112 in the closed position). In still other examples, the arm actuators 134, 136 and/or the gripper actuator 142 may continue to operate (e.g., apply actuating pressure) to hold the arm 114 and the gripper 112 in the desired positon.

In the illustrated example, the UAV 100 is held by the arm 114 and the gripper 112 in a position that is above and outward (to the side) of the object 144. However, in other examples, the UAV 100 may be perched in other positions relative to the object 144, such as directly horizontal from the object 144, directly above the object 144, below the object 144 (e.g., hanging (e.g., directly) downward from the object 144), etc.

While in the illustrated example of FIGS. 1 and 2 the arm 114 has two arm links, in other examples the arm 114 may include more arm links (e.g., three, four, etc.) that are movable relative to each other. In other examples, the arm may include only one link or structure. For example, the arm 114 may only include the first arm link 118 and the gripper 112 may be coupled to the end of the first arm link 118. In such an example, the arm and the gripper 112 may have one degree of freedom. In other examples, no arm may be utilized and, instead, the gripper 112 may be coupled directly to the UAV 100 (e.g., to the bottom 116 of the body 102).

Figure 3:
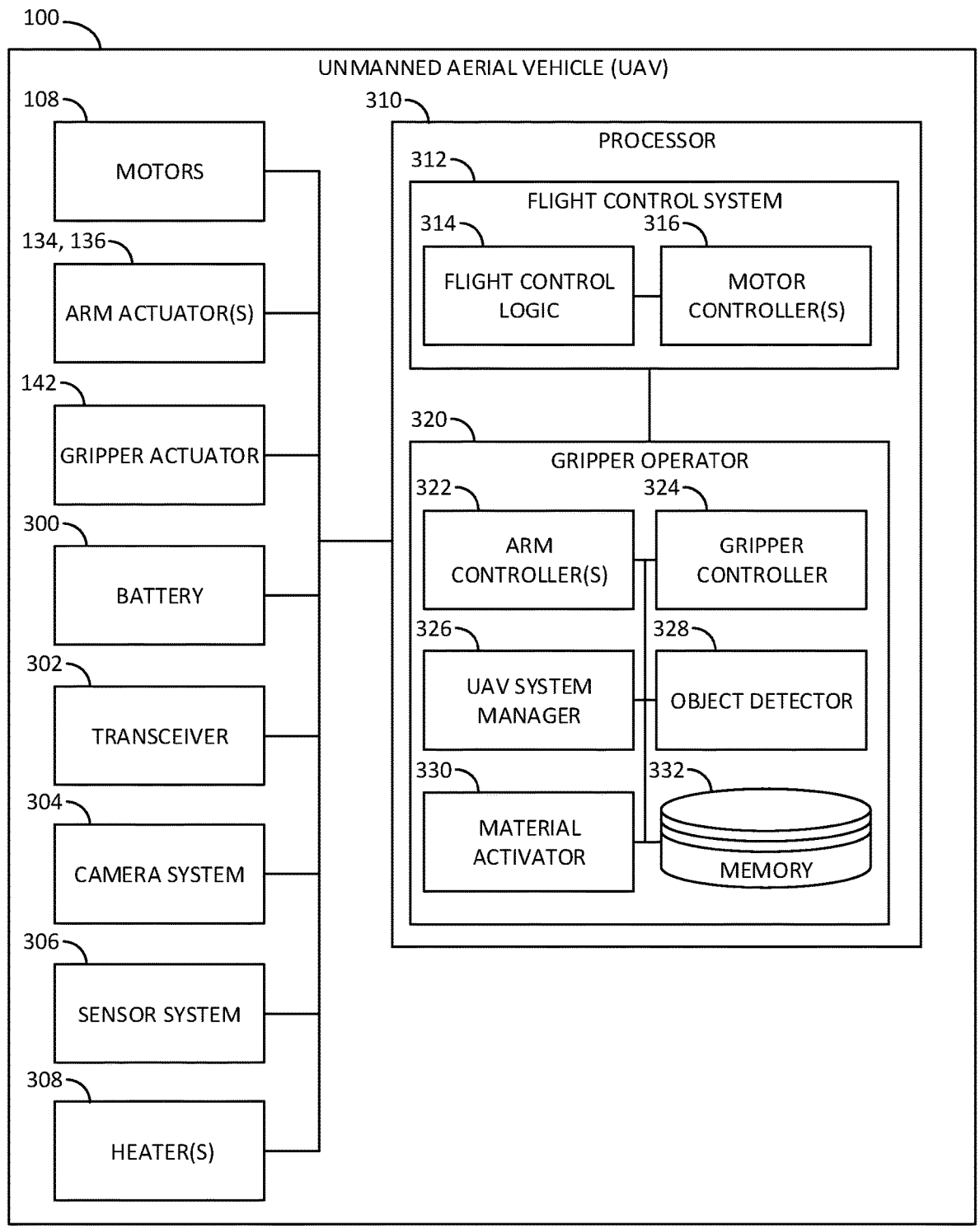
FIG. 3 is a block diagram representing an example implementation of the example UAV of FIG. 1 including an example gripper operator to operate the gripper.

FIG. 3 is a block diagram of an example implementation of the UAV 100 of FIGS. 1 and 2. As disclosed above, the UAV 100 of FIG. 3 includes the motors 108, the first and second arm actuators 134, 136, and the gripper actuator 142. To power the motors 108, the arm actuators 134, 136, the gripper actuator 142, and/or any other components (e.g., sensors, electrical parts) of the UAV 100, the example UAV 100 includes a battery 300. In some examples, the battery 300 is disposed within the body 102 (FIG. 1) of the UAV 100. In some examples, the battery 300 may be removed from the UAV 100 and replaced with another battery. In some examples, the battery 300 is rechargeable (while connected to the UAV 100 and/or separated from the UAV 100).

In the illustrated example of FIG. 3, the UAV 100 includes a transceiver 302, which operates as a transmitter and a receiver, to communicate with another electrical device, such a remote controller for the UAV 100. For example, the transceiver 302 may receive flight commands or instructions from the remote controller.

In some examples, the UAV 100 includes a camera system 304 having one or more cameras to record images and/or video. In some examples, the images and/or video are transmitted, via the transceiver 302, back to the remote controller or another device for presenting the images and/or video to a user for live viewing. In some examples, the camera system 304 includes one or more actuators (e.g., a gimbal) for articulating the camera(s). For example, a user may control the direction of the camera(s) via controls on the remote controller.

In the illustrated example, the UAV 100 includes a sensor system 306 including one or more sensors that may obtain data or measurements for flying the UAV 100, such as a Global Positioning System (GPS) receiver, an inertial measurement unit (IMU) including an accelerometer, a gyroscope, etc., a temperature sensor, an altimeter, and/or any other sensor. In some examples, the UAV 100 may include one or more heaters 308 (e.g., a resistance heater), as discussed in further detail in conjunction with FIGS. 6-8.

In the illustrated example of FIG. 3, the UAV 100 also includes one or more processors 310 to control the various components of the UAV 100. For example, the processor 310 may implement a flight control system 312 including flight control logic 314 and one or more motor controller(s) 316 for controlling (e.g., activating, deactivating, changing the speed, etc.) of the motors 108. The flight control logic 314 may execute instructions to activate the motors 108, via the motor controller(s) 314, to fly the UAV 100 based on instructions from a user and/or data from the sensor system 306.

To control the operations of the gripper 112, the example UAV 100 includes a gripper operator 320, which, in this example, is implemented by the processor 310. In the illustrated example, the gripper operator 320 includes one or more arm controller(s) 322 to control the first and second arm actuators 134, 136 for moving the arm 114. The gripper operator 320 of FIG. 3 also includes a gripper controller 324 to operate the gripper actuator 142 for opening and closing the gripper 112.

In some examples, the gripper operator 320 includes a UAV system manager 326 that monitors and/or controls one or more of the other systems of the UAV 100. The UAV system manager 326 may be used to reduce power to and/or deactivate one or more of the systems on the UAV 100 (e.g., once the UAV 100 is perched). For instance, after the gripper 112 secures the UAV 100 to a support/object, the UAV system manager 326 may deactivate the flight control system 312 and the associated components, such as the motors 108, the sensor system 306, etc., thereby conserving battery power.

In some examples, the gripper operator 320 of the UAV 100 includes an object detector 328 to determine and track a location of an object, which may be used to help align the gripper 112 with an object to be grasped. In some examples, the object detector 328 determines the location of an object based on data from the camera system 304. Additionally or alternatively, the object detector 328 may determine the location of an object based on data from one or more other detection devices on the UAV 100, such as an infrared camera, a photoelectric sensor, etc. The object detector 328 may control the movement of the UAV 100 (via activation of the motors 108 by the motor controller(s) 316), the movement of the arm 114 (via activation of the arm actuators 134, 136 by the arm controller(s) 322), and/or the movement of the gripper 112 (via activation of the gripper actuator 142 by the gripper controller 324). In some examples, the object detector 328 performs an automatic sequence of operations to align the gripper 112 with an object and grasp the object with the gripper 112. The operation may be requested by a user. For example, a user may identify an object to be grasped (e.g., by selecting an object on a screen on which the user is viewing a live feed from the camera system 304) and activate the example operation to be performed by the object detector 328. An example operation of grabbing an object for perching the UAV 100 is disclosed in further detail in connection with FIG. 10.

While in the illustrated example the object 144 is orientated substantially horizontally, the example gripper 112 may be used to grip an object in any other orientation, such as a vertical orientation, or at any angle between vertical and horizontal. For example, the gripper 112 may be used to grasp onto a portion of a tree branch that is angled relative to horizontal.

In some examples, to improve the ability to grasp onto an object with the gripper 112, the example gripper 112 includes one or more layers or strips of an active material disposed along an inner surface of the first and second claws 138, 140. The active material, as disclosed in further detail herein, may be activated (via an activation signal) to transition the material to a state or phase where the material can conform to the contour, shape, or geometry of an object being grasped. As such, the shape of the gripper 112 can be adapted to match or substantially match the shape of an object being grasped, thereby increasing the gripping capabilities of the gripper 112. Depending on the type of active material, the activation signal may be, for example, application of an electric current or voltage, a temperature change, ultraviolet light, a magnetic field, and/or a mechanical loading or stressing.

Figure 4:
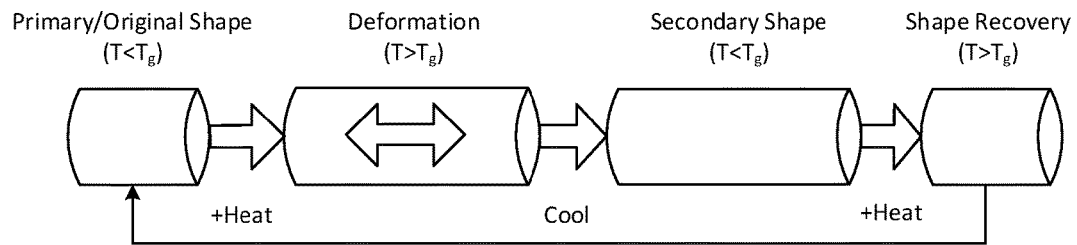
FIG. 4 illustrates example phase changes in an example shape-memory polymer material that may be implemented with the example UAV of FIG. 1 for gripping an object.

An example active material that may be used with the example gripper 112 is a shape-memory polymer (SMP) material. SMP materials react to an activation signal, such as heat, that induces a change in modulus of the material. FIG. 4 illustrates an example phase transition of an SMP material. As mentioned above, SMPs are created to have a baseline, primary, starting, original, and/or global shape to which the material moves back to when heated above a threshold temperature (the glass transition temperature $T_g$). In particular, SMP materials are constructed of polymer networks having primary (permanent) covalent bonds and secondary (temporary) covalent bonds. The primary covalent bonds are formed to maintain the primary shape of the material and are not broken. The secondary covalent bonds also serve to maintain the primary shape, but can be broken to enable the material to change shape. When the SMP material is heated to a threshold temperature (e.g., a temperature above the glass transition temperature $T_g$), the secondary covalent bonds are broken. As such, the SMP material, including the primary covalent bonds, can be stretched, compressed, and/or otherwise deformed into a different shape, referred to a secondary shape. If the material is held in this secondary shape while reducing the temperature of the material below the threshold temperature (e.g., below the glass transition temperature $T_g$, the secondary covalent bonds reattach and hold the material in the secondary (altered) shape. In other words, the material hardens into the secondary shape. In this state, the material can be bent or flexed, but it returns to the secondary shape. If the material is again heated above the threshold temperature, the secondary covalent bonds again break. If the material is unconstrained (e.g., no outside force is applied to the SMP material), the primary covalent bonds prevail as the primary force (because the secondary bonds have been broken). As such, the primary force from the primary covalent bonds acts as the net force on the active material, thereby returning the material to its primary/original shape. Then, upon cooling the material below the threshold temperature, the secondary covalent bonds reattach and the material hardens back into its primary/original shape.

Figure 5:
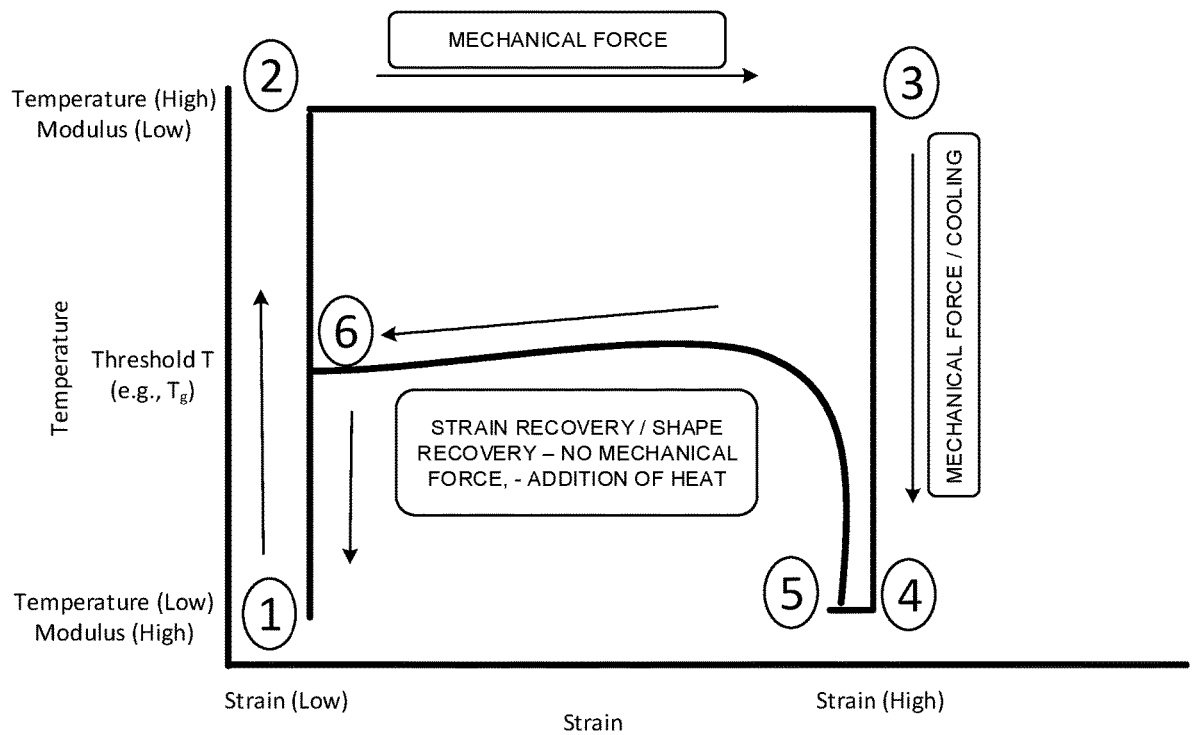
FIG. 5 is an example graph illustrating the temperature and modulus relationship during various phase changes of an example shape-memory polymer.

FIG. 5 is an example graph illustrating the different phases or states of an SMP material relative to temperature, strain, and modulus. The X axis represents strain (sometimes denoted as ε), which represents the material deformation strain compared to the primary/original shape of the SMP. The Y axis represents temperature. Also shown on the Y axis is the modulus of elasticity (sometimes denoted as E). The temperature and modulus of elasticity have an inverse relationship. In other words, as the temperature increases, the modulus of elasticity decreases, and vice versa.

In the illustrated graph, Point 1 in the lower left corner represents the material in the primary state or shape at a first temperature below a threshold temperature (e.g., below the glass transition temperature $T_g$). In this state, the material exhibits a relatively high modulus (stiffness). For example, if the material is bent or twisted, the material returns to its primary shape. Between Point 1 and Point 2, the temperature of the material is increased above the threshold temperature. At point 2, in the upper left corner of the graph, the modulus of elasticity is significantly lower. In this deformable state, the material is relatively soft and can be deformed at much lower force requirements compared to Point 1, and the material now has the potential to not return to its primary shape. Between Point 2 and Point 3, an external mechanical force is applied to the material that changes the shape of the material. This force increases the strain experienced by the material. At Point 3, the temperature of the material is still above the threshold temperature and the material has been deformed into a new shape. Then, between Point 3 and Point 4, the temperature of the material is reduced to below the threshold temperature while the material is held in the deformed shape. At Point 4, the temperature of the material falls below the threshold temperature and the material thus will remain in the deformed shape (which becomes the secondary shape) even after the mechanical force is removed. The modulus of the material at Point 4 is the same as or substantially the same as the modulus at Point 1. Therefore, similar to the material in the primary shape (Point 1), if the material is bent or twisted, the material returns to its secondary shape. Once the material cools to Point 4, there may be a small amount of shape recovery (creep), as shown between Point 4 and Point 5, where the material slightly flexes toward the primary shape, (resulting in a slight decrease in strain).

To transition the material back to its primary state or shape (e.g., perform shape recovery), heat is added to the material until the material is above the threshold temperature, as shown between Point 5 and Point 6. When heated above the threshold temperature, the modulus again decreases and the material becomes soft and deformable. If no mechanical force is applied to the material while so heated, the material morphs back into the primary shape, at Point 6. No outside force is required to move the material back into the primary shape. Instead, in the absence of external force, the material returns to its primary shape. Subsequently, in FIG. 5, the material is cooled to below the threshold temperature (e.g., the glass transition temperature $T_g$) such that the modulus (stiffness) returns to a relatively high level and the material retains the primary shape. This cycle can be repeated numerous times.

In some examples, SMP materials are constructed via injection molding and a post treatment process, such as irradiation, is used to establish covalent bonds to set the primary shape. The irradiation may be performed while the material is in the injection mold (the desired primary shape), or in a shape that is constrained to a desired shape after the injection molding. These manufacturing processes are relatively inexpensive. SMP materials can be designed to have almost any threshold temperature (e.g., almost glass transition temperature $T_g$). For example, the threshold temperatures of these materials may be formulated to occur at subzero temperatures up to temperatures at or near 200° C. (such as with thermo-plastics), or even higher (e.g., above normal life sustaining temperatures). With a low threshold temperature (where the modulus change is fully observed), the material may be relatively stiff when handled, and then becomes soft on contact with a heat source, such as heat from contact with a human body, where it becomes almost the same modulus (stiffness) as human flesh.

Further, SMP materials can be designed to have different ranges of pressure. For example, an SMP may be designed to change from 100 megapascal (MPa) to less than 1 MPa in a few degrees temperature change, or over a wider temperature range. In some examples, the absolute stiffness can be on the order of 0.3 to 0.5 million pounds-per-square-inch (PSI). Also, in some examples, SMP materials can have a recoverable strain of 50%-735%. Some example SMP materials that may be implemented in the example gripper 112 include polyether ether ketone (PEEK), polyethylene terephthalate (PET), poly(methyl methacrylate) (PMMA), trimethylolpropane triacrylate (TMPTA), or isobornyl methacrylate (MA/IBoA). In other examples, other types of SMP materials may be used.

Referring back to FIG. 3, the gripper operator 320 includes a material activator 330 that applies an activation signal to the active material. As disclosed above, the active material may be, for example, an SMP, and the activation signal may be application of heat to the SMP material. For example, in FIG. 3, the UAV 100 includes the heater(s) 308, which may be disposed in or around the active material to affect the temperature of the active material. The material activator 330 may control the heater(s) 308 to increase the temperature of the active material. The example gripper operator 320 also includes a memory 332.

Figure 6:
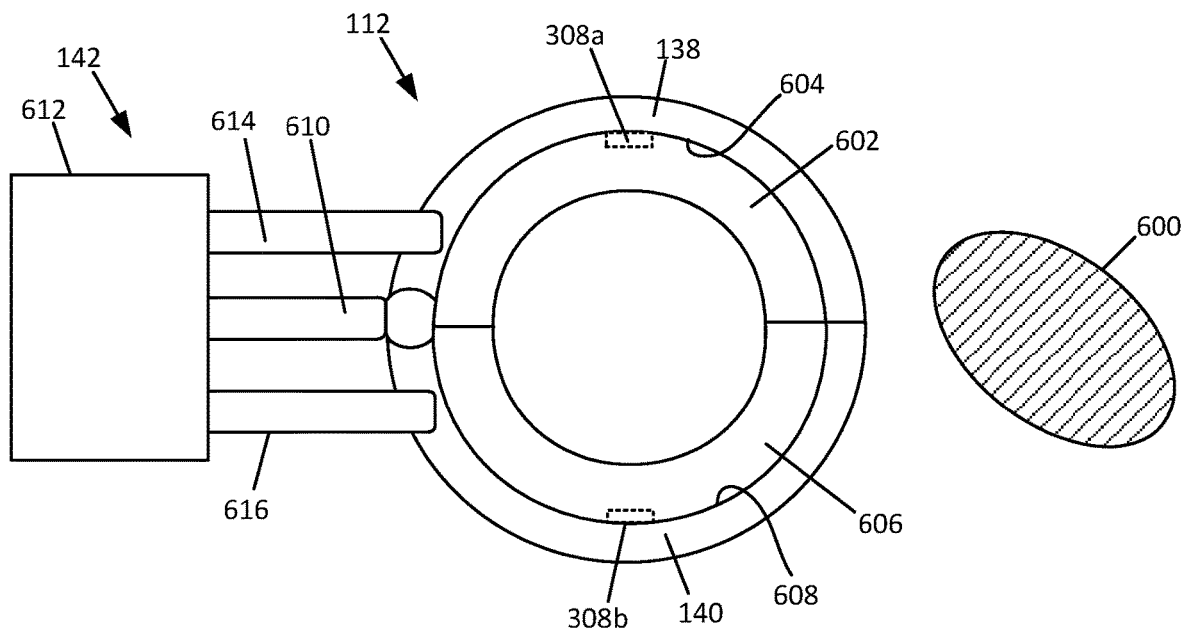
FIGS. 6-8 illustrate an example sequence of gripping an object with the example gripper of FIG. 1 using an active material.
Figure 7:
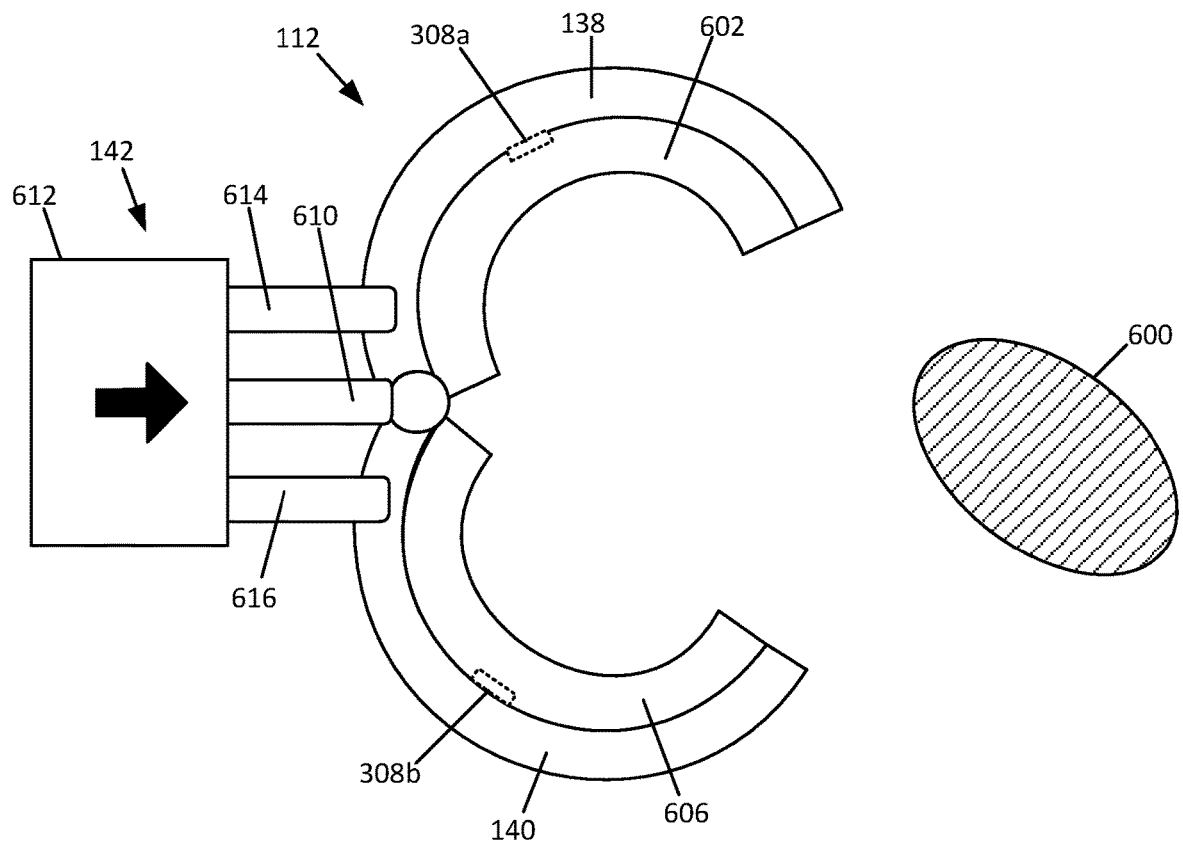
Figure 8:
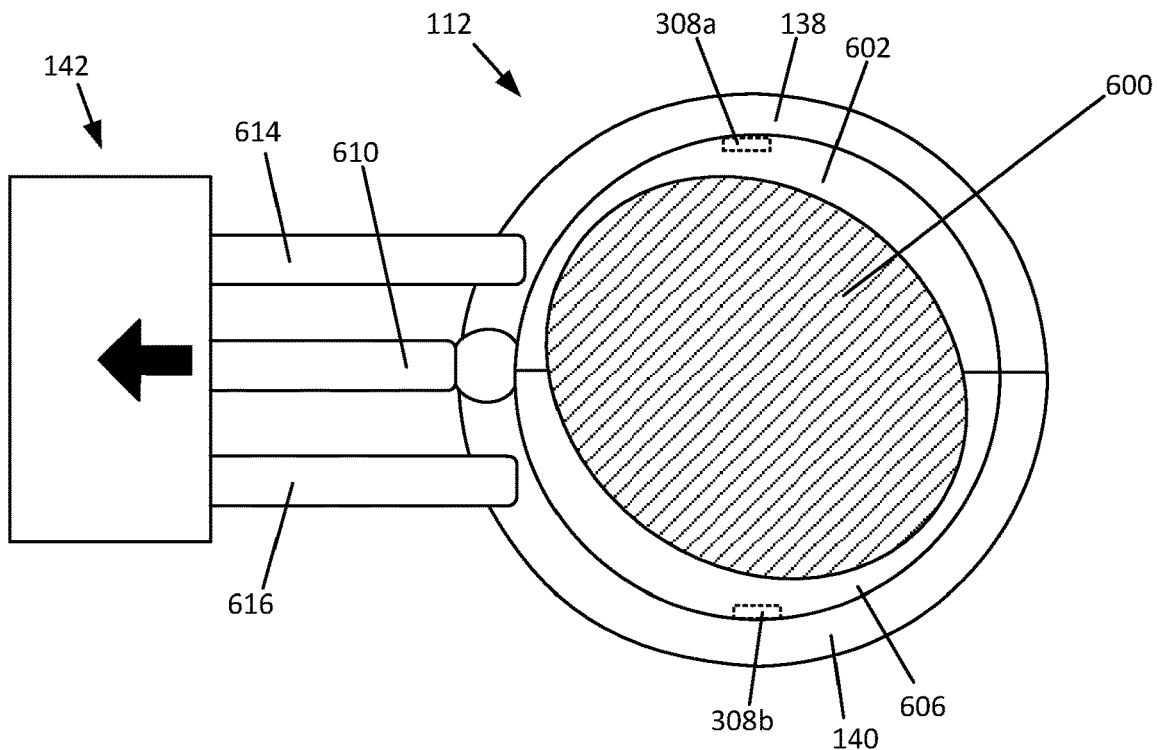

FIGS. 6-8 illustrate an example sequence of using the gripper 112 of FIGS. 1 and 2 with an active material to grasp an object 600. As can be understood from looking at FIG. 6, if the first and second claws 138, 140 were closed onto the object 600 (without an active material), the gripper 112 may not make sufficient contact with the object 600 (because of the non-circular cross-sectional shape of the object 600) to hold the UAV 100 in a perched position. In the illustrated example, the object 600 has a non-circular cross-section, which does not match the shape of the first and second claws 138, 140. As such, if the first and second claws 138, 140 were closed around the object 600, less than full contact may be made between the first and second claws 138, 140 and the object 600. Further, even with objects that may have shapes that match the gripper 112 (e.g., an object with a circular cross-section), the contact surfaces between the first and second claws 138, 140 and the object may allow slippage. Therefore, in some examples, alternatively and/or additionally to applying greater pressure with the gripper 112 to create a secure connection, the gripper 112 includes one or more active materials to enhance the gripping capabilities.

In the illustrated of FIG. 6, the gripper 112 includes a first active material 602 disposed on the first claw 138 and a second active material 606 disposed on the second claw 140. In this examples, the first active material 602 is disposed along an inner surface 604 of the first claw 138 and the second active material 606 is disposed along an inner surface 608 of the second claw 140. In the illustrated example, the first active material 602 has a profile or shape (e.g., an arch) that matches the inner surface 604 of the first claw 138 and the second active material 606 similarly has a profile or shape that matches the inner surface 608 of the second claw 140. In the illustrated example, the first and second active materials 602, 606 form a substantially constant ring or lop of material when the first and second claws 138, 140 are closed. However, in other examples, the first and/or second active materials 602, 606 may be smaller or larger and may cover only a portion or section of the respective inner surfaces 604, 608. Further, while the first and second active materials 602, 606 appear to have a thickness of about the same as the thickness of the first and second claws 138, 140, in other examples, the first and/or second active materials 602, 606 may be thinner or thicker. The first and second active materials 602, 606 may be coupled to the respective inner surfaces 604, 608 via any mechanical and/or chemical (e.g., an adhesive) fasteners.

In this example, the first and second active materials 602, 606 are SMP materials (e.g., the first and second active materials 602, 606 may be the same or different types of SMP materials). In this example, the first and second active materials 602, 606 are constructed to have a primary shape as shown in FIG. 6. To transition the first and second active materials 602, 606 to their deformable state, which is the state where the first and second active materials 602, 606 are heated above their threshold temperature where the modulus of elasticity drops off (e.g., a state between the primary and secondary states), one or more heaters (e.g., resistance heaters) are disposed in or near the first and second active materials 602, 606. For instance, in the illustrated example of FIG. 6, a first heater 308a is disposed in the first active material 602 and a second heater 308b is disposed in the second active material 606. The first and second heaters 308a, 308b correspond to the heater(s) 308 of FIG. 3. The first and second heaters 308a, 308b may be activated to heat the first and second active materials 602, 606, as disclosed in further detail herein.

The gripper 112 may be opened by activating the gripper actuator 142. In the illustrated example, the first and second claws 138, 140 are pivotably coupled to a rod 610 of the gripper actuator 142. In the illustrated example, the gripper actuator 142 is a linear actuator that actuates to move the rod 610 linearly (e.g., left and right in FIG. 6) into and out of a housing 612. The housing 612 may contain one or more parts (e.g., a motor) to move the rod 610. The gripper actuator 142 may be hydraulically and/or electrically powered. In the illustrated example, a first post 614 and a second post 616 extend from the housing 612 (and/or another rigid structure). The first claw 138 is pivotably coupled to an end of the first post 614 and the second claw 140 is pivotably coupled to an end of the second post 616.

To open the gripper 112, the gripper actuator 142 extends the rod 610 (moves the rod 610 to the right in FIG. 6), which causes the first claw 138 to pivot upward on the first post 614 and the second claw 140 to pivot downward on the second post 616, as illustrated in FIG. 7. As such, the first and second claws 138, 140 are moved apart from each other.

To reduce the modulus of elasticity of the first and second active materials 602, 606, the material activator 330 applies an activation signal to the first and second active materials 602, 606. In this example, the material activator 330 (FIG. 3) applies an activation signal by activating the first and second heaters 308a, 308b to increase the temperatures of the first and second active materials 602, 606 above the respective threshold temperatures (which may or may not be the same). The active materials 602, 606 may be created to have a threshold temperature that is slightly above ambient temperature (e.g., 10° over ambient). As such, a relatively low amount of energy is needed to heat the first and second active materials 602, 606. In some examples, the first and second active materials 602, 606 need only be heated a few degrees (or less) above the threshold temperature to experience full modulus change. Thus, transitioning the material (s) 602, 606 from their primary state to their intermediate/deformable state uses a relatively low amount of energy. In other examples, the first and/or second active materials 602, 606 may be designed with threshold temperatures that are higher or lower (sub-ambient) based on the desired application, environment, and/or needs (e.g., in outer space, the north pole, etc.).

The threshold temperature for the first and second active materials 602, 606 may be stored, for example, in the memory 332 (FIG. 3). By heating the first and second active materials 602, 606 above the threshold temperature (e.g., the glass transition temperature $T_g$), the secondary covalent bonds of the first and second active materials 602, 606 break, which decreases the modulus of elasticity of the first and second active materials 602, 606 and enables the first and second active materials 602, 606 to be deformed. As such, the first and second active materials 602, 606 transition from a first state having a first modulus of elasticity to a second state having a second modulus of elasticity, where the second modulus is less than the first modulus of elasticity.

In some examples, prior to closing the first and second claws 138, 140 onto the object 600, the material activator 330 determines if the first and second active material 602, 606 have transitioned into their deformable states (e.g., the state at Point 2 in the example graph of FIG. 5). In some examples, the material activator 330 determines whether the first and second active materials 602, 606 have transitioned into their deformable states based on the temperatures of the first and second active materials 602, 606 being above their threshold temperature. For example, one or more temperature sensors may be used to measure the temperature of the first and/or second active materials 602, 606. The temperature sensor(s) may be disposed in or around the first and/or second active materials 602, 606. The temperature sensor(s) may provide feedback to the material activator 330, which may heat the first and second active materials 602, 606 until the first and second active materials 602, 606 are above the threshold temperature. Additionally or alternatively, in some examples, the material activator 330, may apply heat for a certain period of time (e.g., one minute, two minutes, etc.) sufficient to ensure the first and second active materials 602, 606 are heated above the threshold temperature given the current environmental condition.

After the first and second active materials 602, 606 are transitioned into their deformable states (e.g., above the glass transition temperature $T_g$), the first and second claws 138, 140 may then be closed onto the object 600. For example, as illustrated in FIG. 8, the first and second claws 138, 140 are closed onto the object 600, such that the first and second active materials 602, 606 engage the outside of the object 600. To close the gripper 112, the gripper actuator 142 retracts the rod 610 (to the left in FIG. 8), which causes the first claw 138 to pivot downward on the first post 614 and the second claw 140 to pivot upward on the second post 616, thereby closing the first and second claws 138, 140 onto the object 600. In some examples, the gripper actuator 142 actuates (closes) the first and second claws 138, 140 until a particular pressure is reached. In some examples, one or more calibration tests may be performed with the gripper 112 and the first and second active materials 602, 606 to characterize the load needed for certain shapes that demonstrate reasonable surface area contact with various objects. By monitoring the load and deflection, eventually the curve may takes an exponential path indicating that less and less strain is achieved proportional to the input force. An exponential turn up may indicate that the material can be cooled, to prevent excessive load on the object, and to convert a high modulus where the load can be maintained or relaxed.

Because the first and second active materials 602, 606 are sufficiently heated in this example, the first and second active materials 602, 606 are deformable and conform to the shape of the object 600 as the first and second claws 138, 140 are closed onto the object 600, as illustrated in FIG. 8. In particular, as the first and second claws 138, 140 press the first and second active materials 602, 606 against the object 600, the first and second active materials 602, 606 compress, stretch, and/other otherwise conform to the shape of the object 600. This interaction creates greater surface area contact (e.g., intimate contact) between the object 600 and the first and second active materials 602, 606 and, thus, between the object 600 and the first and second claws 138, 140.

Once the first and second claws 138, 140 are closed onto the object 600 and the first and second active materials 602, 606 are deformed, the material activator 330 reduces or ceases the activation signal. For example, the material activator 330 may reduce or cease power to the heaters 308a, 308b, which allows the first and second active materials 602, 606 to cool to a temperature below the threshold temperature. As the first and second active materials 602, 606 fall to below the threshold temperature, the previously broken secondary covalent bonds reattach. As a result, the modulus of elasticity of the first and second active materials 602, 606 increases and the first and second active materials 602, 606 retain the shape matching the geometry of the object 600. In other words, the first and second active materials 602, 606 harden to the shape shown in FIG. 8 (e.g., the secondary shape). As such, the first and second active materials 602, 606 apply a substantially uniform inward force on the object 600 that creates more friction and, thus, increases the gripping force of the gripper 112. Therefore, rather than using a padding or soft material on the gripper that only applies contact pressure in certain areas, the first and second active materials 602, 606 form hardened contact surfaces that provide inward contact pressure around the object 600. In some examples, the pressure is substantially uniform around the object 600. Further, by using active materials that match the shape of the object 600, the first and second active materials 602, 606 create a shape-locking feature, where rotation of the object 600 not only has to work against the friction between the object 600 and the first and second active materials 602, 606, but would also have to strain/morph the shape of the first and second active materials 602, 606 when they are in their high modulus (hardened) condition, for a more robust connection.

Figure 9:
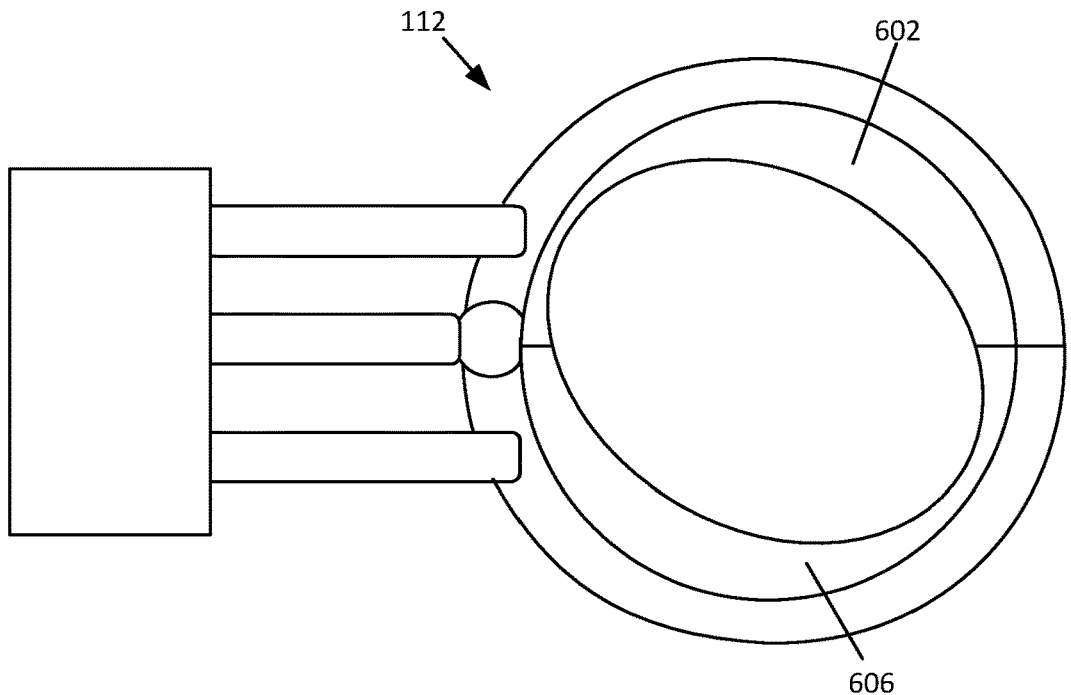
FIG. 9 illustrates the example gripper and the example active material from FIG. 8 without the example object.

The first and second active materials 602, 606 retain the secondary shape as along as the first and second active materials 602, 606 are not heated above the threshold temperature (e.g., the glass transition temperature $T_g$). In other words, even if the gripper 112 opens and detaches from the object 600, the first and second active materials 602, 606 retain their secondary shape, as long as they are not heated above the threshold. For example, as shown in FIG. 9, the object 600 (FIG. 8), has been removed, and shape of the first and second active materials 602, 606 matching the object 600 remains. In some examples, after releasing the object 600 from the gripper 112, it may be desirable to keep the first and second active materials 602, 606 in the secondary shapes. For example, the UAV 100 may intend to detach from the object 600, fly away, and then return and reattach to the object 600. In such an example, the first and second active materials 602, 606 may retain the secondary shape for reattaching to the object 600 without requiring re-heating to re-conform the first and second active materials 602, 606 to the surfaces.

To transition the first and second active materials 602, 606 back to their primary shapes, or to another (e.g., new) secondary shape, the first and second claws 138, 140 may be opened and the first and second active materials 602, 606 may again be heated above the threshold temperature. If the first and second active materials 602, 606 are unconstrained (i.e., no outside or mechanical force is applied to the first and second active materials 602, 606), the first and second active materials 602, 606 morph back to the primary shapes (e.g., the shapes shown in FIG. 6) due to their primary covalent bond networks. If, subsequently, the first and second active materials 602, 606 are cooled to below the threshold temperature without any outside force affecting the materials, the secondary bonds reattach the first and second active materials 602, 606 to retain their primary shapes. In some examples, the first and/or second active materials 602, 606 are non-sticky and do not stick to an object being gripped, which enables relative easy release of the object. However, in other examples, the first and/or second active materials 602, 606 may be sticky and/or a sticky material may be added to the first and/or second active materials 602, 606 to improve the contact/connection between the gripper 112 and the object.

In examples disclosed above, the first and second active materials 602, 606 are activated (e.g., heated to a temperature above the threshold temperature) prior to closing the first and second claws 138, 140 onto the object 600. However, in other examples, the first and second claws 138, 140 may be closed onto the object 600 first and then the first and second active materials 602, 606 may be activated (e.g., heated above the threshold temperature). In such an example, once the first and second active materials 602, 606 transition into their deformable state and conform to the object 600, the first and/or second claws 138, 140 may move slightly inward (because of the compression and/or readjustment of the first and second active materials 602, 606 around the object 600). In some examples, this movement is detected by the gripper actuator 324 and used to determine whether the first and second active materials 602, 606 have properly transitioned in their deformable states. For example, the material activator 330 may apply an activation signal to the first and second active materials 602, 606 while the gripper controller 324 actuates the gripper 112 (via the gripper actuator 142) to apply gripping pressure on the object 600. The gripper controller 324 monitors for feedback (e.g., movement in the form of a control signal) from the gripper actuator 142 that the first and/or second claws 138, 140 have moved inward, at which point the gripper controller 324 identifies that the first and second active materials 602, 606 have been properly transitioned into their deformable states. Further, in some examples, the gripper controller 324 and/or the material activator 330 can determine the percentage of modulus change in the first and second active materials 602, 606 based on how rapid the movement occurs (e.g., a lower modulus results in a more deformable material that flexes faster).

In the illustrated example, the gripper 112 closes completely around the object 600 such that the ends of the first and second claws 138, 140 touch or engage each other. However, in other examples, the object 600 may have a larger diameter, such that the gripper 112 may not completely close around the object. The example gripper 112 may be used to grasp onto an object having any shape and/or size that can fit between the first and second claws 138, 140 in the open position.

While in the examples above the gripper 112 is disclosed as having two claws, in other examples, the gripper 112 may only have one claw, such as the first claw 138. In other examples, more than two claws may be implemented. In some examples, the claw(s) may be formed to have more or less curvature than shown in the illustrated examples. In some examples, the claw(s) may include one or more fingers that are separable controllable. For example, the gripper may include one claw that has thee moveable sections that can wrap (via actuation) around an object. In some examples, the claws are not aligned so that their ends do not engage each other when closed. In such examples, the claws can move "past" each other to grasp objects having a smaller diameter than would be possible with claws of the same size that are aligned to engage.

The example teachings disclosed herein regarding active materials can similarly be used in other facets of the UAV 100. For example, an active material (e.g., an SMP) may be disposed on the bottom of the legs or feet 110 (FIG. 1) of the UAV 100 to enable the bottom of the feet to conform to a support surface and reduce potential slippage between the feet and the support surface. As another example, an active material may be used on a transfer tube port that can dock to another UAV (or another device) for transferring materials. In such an example, morphing the active material can create a relatively close fit seal to transfer materials between the UAVs. As another example, active materials may be disposed on and/or integrated into one or more surfaces (e.g., a control surface or lift surface) of the UAV 100 to morph to change the shape of the UAV, which may be used to increase fit and/or change the airfoil characteristics.

While the example gripper 112 with active material is described in connection with a rotorcraft UAV, the example gripper 112 with active material can likewise be used on other types of aircraft, manned or unmanned, having other types of propulsion generators (e.g., jet engines). Further, the example gripper 112 with active material can be used on non-aircraft devices, such as robots in a manufacturing assembly line.

While an example manner of implementing the gripper operator 320 is illustrated in FIG. 3, one or more of the elements, processes and/or devices illustrated in FIG. 3 may be combined, divided, re-arranged, omitted, eliminated and/or implemented in any other way. Further, the example arm controller(s) 322, the example gripper controller 324, the example UAV system manager 326, the example object detector 328, the example material activator 330 and/or, more generally, the gripper operator 320 of FIG. 3 may be implemented by hardware, software, firmware and/or any combination of hardware, software and/or firmware. Thus, for example, any of the example arm controller(s) 322, the example gripper controller 324, the example UAV system manager 326, the example object detector 328, the example material activator 330 and/or, more generally, the gripper operator 320 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example arm controller(s) 322, the example gripper controller 324, the example UAV system manager 326, the example object detector 328, and/or the example material activator 330 is/are hereby expressly defined to include a non-transitory computer readable storage device or storage disk such as a memory, a digital versatile disk (DVD), a compact disk (CD), a Blu-ray disk, etc. including the software and/or firmware. Further still, the example gripper operator 320 of FIG. 3 may include one or more elements, processes and/or devices in addition to, or instead of, those illustrated in FIG. 3, and/or may include more than one of any or all of the illustrated elements, processes and devices.

Figure 10:
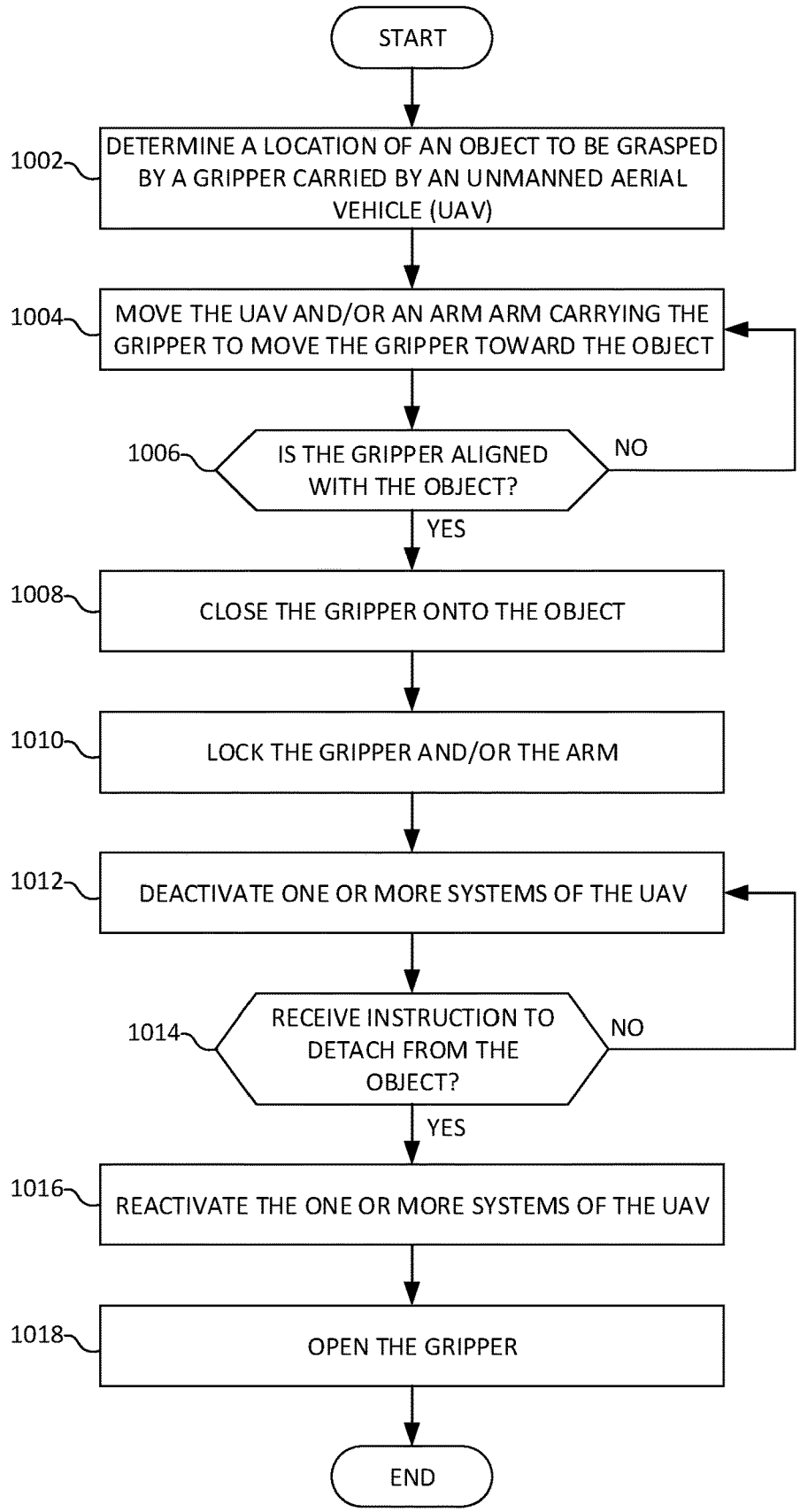
FIG. 10 is a flowchart representative of example machine readable instructions that may be executed to implement the example gripper operator of FIG. 3 to grasp an object with the example gripper.
Figure 11:
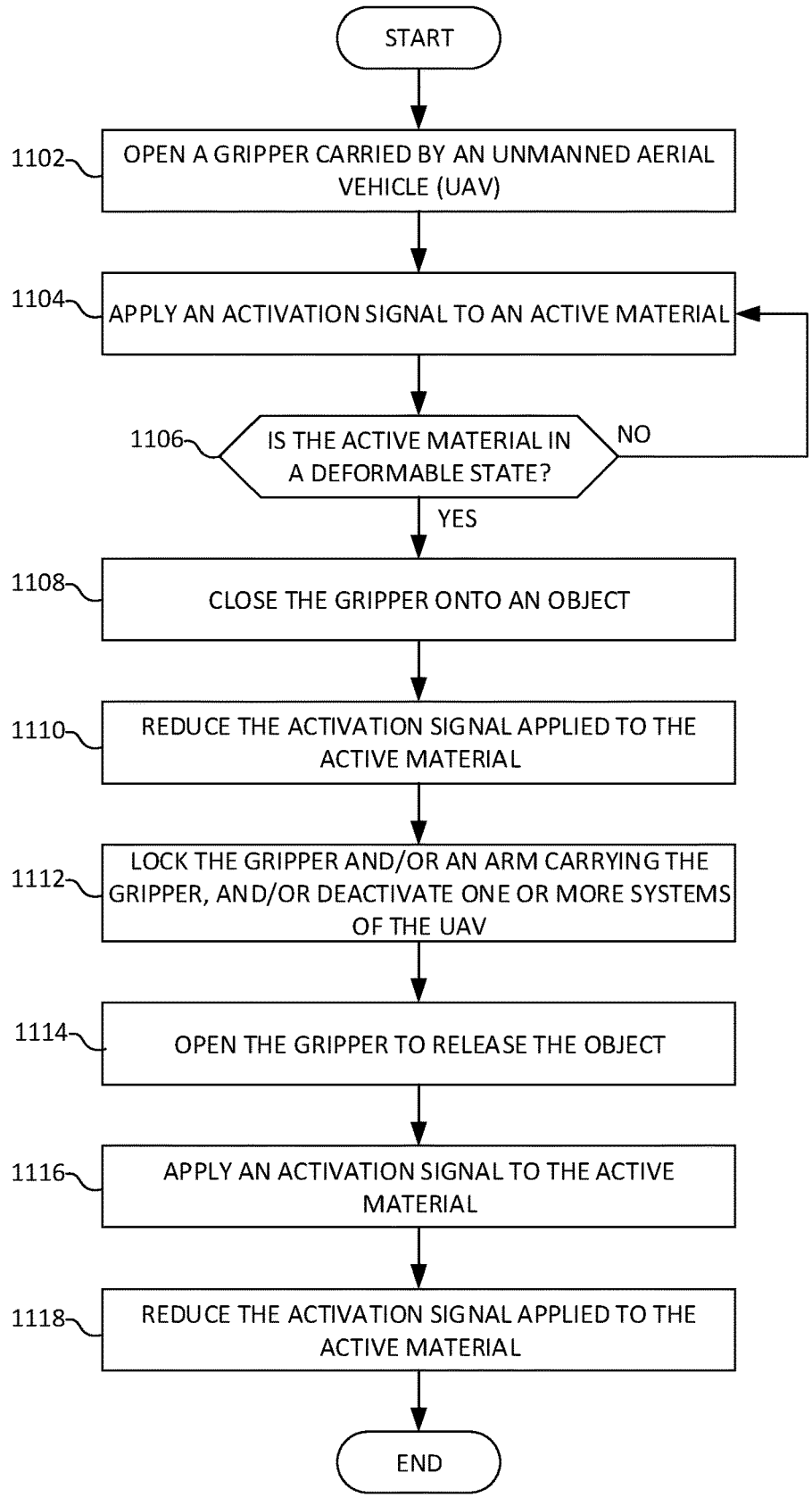
FIG. 11 is a flowchart representative of example machine readable instructions that may be executed to implement the example gripper operator of FIG. 3 to utilize an active material when gripping an object with the example gripper.

Flowcharts representative of example machine readable instructions for implementing the gripper operator 320 of FIG. 3 are shown in FIGS. 10 and 11. In this example, the machine readable instructions comprise a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 10 and 11, many other methods of implementing the example gripper operator 320 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 10 is a flowchart 1000 representative of example machine readable instructions that may be executed by the processor 310 to implement the example gripper operator 320 of FIG. 1 to grip an object. The example process of FIG. 10 is described in connection with the example UAV 100 and the example gripper 112 of FIGS. 1 and 2 engaging in a perching process. However, it is understood that the example process may be implemented by other types of UAVs having other types of gripping mechanisms and/or gripping objects for purposes other than perching (e.g., to carry an object, to move an object, etc.).

At block 1002, the object detector 328 determines a location of an object, such as the object 144, to be grasped by the gripper 112. In some examples, an object may be selected via user input. For example, a user (e.g., a pilot controlling the UAV 100) may identify an object relative to the UAV 100 and instruct the UAV (e.g., via signal from a remote controller) to grasp onto the object 144. In some examples, the object detector 328 determines the location of the object 144 based on measurements from the camera system 304.

At block 1004, the object detector 328 controls the motors 108 (via the motor controller 316) and/or the arm actuators 134, 136 (via the arm controller(s) 322) to move the gripper 112 toward the object 144. If the gripper 112 is closed, the gripper controller 324 activates the gripper actuator 142 to open the gripper 112 (e.g., to move the first and second claws 138, 140 apart) prior to moving toward the object 144. In some examples, the arm 114 may be controlled to support the UAV 100 on the object 144 at a particular angle relative to the object 144. For example, a user may select a certain position in which the UAV 100 is to be perched on the object 144 (e.g., at a 45° relative to the object 144). Therefore, the arm controller(s) 322 may positon the arm 114 in a particular orientation.

At block 1006, the object detector 328 determines if the gripper 112 is aligned with the object 144. The object detector 328 may determine if the gripper 112 is aligned with the object 144 based on measurements from the camera system 304. If the gripper 112 is not aligned with the object 144, the object detector 328 continues to control the motors 108 and/or the arm 114 to move the gripper 112 into alignment with the object 144.

If the gripper 112 is aligned with the object 144 (as determined at block 1006), the gripper controller 324, at block 1008, activates the gripper actuator 142 to close the first and second claws 138, 140 onto the object 144. In some examples, the gripper controller 324 may activate the gripper actuator 142 to close the first and second claws 138, 140 until a threshold pressure is reached (e.g., a pressure sufficient to support the UAV 100 in the perching position).

In some examples, once the first and second claws 138, 140 are closed onto the object 144, the arm actuators 134, 136 and/or the gripper actuator 142 may be deactivated. In some examples, the arm 114 and the gripper 112 remain rigid and static when not activated. As such, the arm 114 and the gripper 112 retain their current position or state after actuation (to hold the UAV 100 in the desired position. In other examples, the UAV 100 may include one or more locks or latches (e.g., solenoids) that may be activated to the lock the arm 114 and/or the gripper 112 in a fixed position (e.g., lock the gripper 112 in the closed position). In some such examples, at block 1010, the arm controller(s) 322 and/or the gripper controller 324 may actuate the one or more locks to retain the arm 114 and/or the gripper 112 in position. In still other examples, the arm actuators 134, 136 and/or gripper actuator 142 may continue to operate (e.g., apply force) to hold the UAV 100 in the desired positon.

At block 1012, the UAV system manager 326 deactivates one or more systems of the UAV to conserve battery power. In some examples, the UAV system manager 326 instructs the motor controller(s) 316 to cease activation of the motors 108. Because the UAV 100 is supported by the object 144, the rotor blades 106 are not needed to generate lift to hover the UAV 100. In other examples, the motors 108 may continue to operate, but at a slower speed (e.g., a speed that would normally not generate sufficient lift to hover the UAV 100). In some examples, the UAV system manager 326 switches the UAV 100 into a rest mode or a sleep mode, which automatically deactivates certain ones of the system(s) (simultaneously or in a particular sequence).

The UAV 100 may remain in the perched position indefinitely. In some examples, one or more other systems of the UAV 100 may continue to be operable while the UAV 100 is perched. For example, while the UAV 100 is perched, the camera system 304 may be used to record images and/or video (e.g., using the camera system 304). In some examples, a user may control the direction and/or other functions of the camera(s). Additionally or alternatively, the UAV 100 may perform other tasks while perched, such as obtaining measurements (e.g., temperature, pressure, etc.) and transmitting the measurements to a user.

In some examples, the perching process of FIG. 10 (blocks 1002-1012) may be performed automatically by the gripper operator 320. For example, a user may initiate a perching process by activing a perching mode (detected by the UAV system manager 326) that automatically performs this process. In other examples, a user may manually control the UAV 100 and control the operation of the arm 114, the gripper 112, etc.

At block 1014, the UAV system manager 326 monitors (e.g., continuously or periodically) for a signal or instruction (e.g., from a remote controller) to detach from the object 144. If an instruction is not received, the one or more systems of the UAV 100 remain deactivated at block 1012. If an instruction is received to detach from the object 144, the UAV system manager 326, at block 1016, reactivates the one or more systems, including the flight control system 312 and the motors 108, which are reactivate to drive the rotor blades 106 to generate lift and hover the UAV 100. At block 1018, the gripper controller 324 instructs the gripper actuator 142 to open the gripper 112 to release the object 144 from the gripper 112. The motors 108 may be re-activated prior to opening the gripper 112, simultaneous to opening the gripper 112, or after opening the gripper 112. The arm 114 may then be retracted to move the gripper 112 closer to the body 102 and the UAV 100 may fly away from the object 144. After block 1018, the example process of FIG. 10 ends, or the example perching process may be repeated again (with the same object or a different object).

FIG. 11 is a flowchart 1100 representative of example machine readable instructions that may be executed by the processor 310 to implement the example gripper operator 320 of FIG. 1 to grip an object using the first and second active materials 602, 606. The example process may be performed to grip an object that is to be carried by the UAV 100, to grip an object for perching the UAV 100, and/or for other purposes. While the example process of FIG. 11 is described in connection with the example UAV 100 and the example gripper 112 of FIGS. 1-9, it is understood that the example process may be similarly implemented by other types of UAVs having other types of gripping mechanisms. Also, while the example process is described in connection the first and second active materials 602, 606, it is understood at the same process may be implemented for just one active material (e.g., the first active material 602) or more than two active materials.

The example process of FIG. 11 may be applied during blocks 1004-1008 of FIG. 10, for example, where the UAV 100 grasps onto an object for perching. At block 1102, the gripper controller 324 activates the gripper actuator 142 to open the first and second claws 138, 140. At block 1104, the material activator 330 applies an activation signal to the first and second active materials 602, 606 to transition the first and second active materials 602, 606 into their deformable state. Therefore, in this example, the material activator 330 provides means for applying an activation signal to an active material. In some examples, the activation signal is the application of heat. For example, in the UAV 100 of FIG. 3 (and as shown in FIGS. 6-8), the first and second heaters 308a, 308b may be disposed in or near the first and second active materials 602, 606. The material activator 330 may activate the heaters 308a, 308b to increase the temperature of the first and second active materials 602, 606 beyond the threshold temperature (e.g., the glass transition temperature $T_g$), which breaks the secondary covalent bonds and enables the first and second active materials 602, 606 to become soft and deformable (transition into their deformable state).

At block 1106, the material activator 330 determines if the first and second active material 602, 606 have been transitioned into their deformable states. In some examples, the material activator 330 determines whether the first and second active materials 602, 606 have been heated above their threshold temperature (e.g., the glass transition temperature $T_g$). For example, one or more temperature sensors may be used to measure the temperature of the first and/or second active materials 602, 606. The temperature sensor(s) may be provided in or around the first and/or second active materials 602, 606. The temperature sensor(s) may provide feedback to the material activator 330, which may continue to heat the first and second active materials 602, 606 until the first and second active materials 602, 606 are above the threshold temperature. Additionally or alternatively, in some examples, the material activator 330, may apply heat for a certain period of time (e.g., one minute, two minutes, etc.) sufficient to ensure the first and second active materials 602, 606 are heated above the threshold temperature. In other examples, other techniques may be used to determine whether the first and second active materials 602, 606 are in their deformable states.

At block 1108, the gripper controller 324 activates the gripper actuator 142 to close the first and second claws 138, 140 onto the object 600. Therefore, in this example, the gripper controller 324 (and/or the gripper actuator 142) provides means for closing the gripper 112 onto an object. As the first and second claws 138, 140 close onto the object 600, the first and second active materials 602, 606 engage the surface of the object 600 conform to the shape or geometry of the object 600. In some examples, the gripper actuator 142 continues to close the first and second claws 138 140 until a threshold pressure is reached. At block 1110, the material activator 330 reduces or ceases the activation signal applied to the first and second active materials 602, 606. Therefore, in this example, the material activator 320 may provide means for reducing or ceasing the activation signal. For example, the material activator 330 may cease activation of the heaters 308a, 308b. As a result, the first and second active materials 602, 606 cool to a temperature below the threshold temperature (e.g., the glass transition temperature $T_g$) of the first and second active materials 602, 606. As such, the secondary covalent bonds of the first and second active materials 602, 606 reattach to retain the material in the secondary shape, thereby forming a shape with the first and second active materials 602, 606 that matches the shape of object 600 (or a portion of the object 600) and, thus, provides enhanced gripping capabilities.

In some examples, once the gripper 112 is closed onto the object and the first and second active materials 602, 606 are hardened into the shape of the object 600, the gripper 112 and/or the arm 114 may be locked in position, such as when the UAV 100 is perching. Further, in some examples, the UAV system manager 326 provides means for deactivate one or more systems (e.g., the motors 108) of the UAV 100 to conserve battery power. For example, at block 1112, the arm 114 and/or the gripper 112 may be locked in position (e.g., the position shown in FIG. 2), and one or more systems of the UAV 100 may be deactivated, similar to blocks 1010 and 1012 of FIG. 10.

When it is desired to release the object 600, the gripper controller 324, at block 1114, activates the gripper actuator 142 to open the gripper 112 and release the object 600. Therefore, in this example, the gripper controller 324 (and/or the gripper actuator 142) provides means for opening the gripper 112. In some examples, the gripper controller 324 opens the gripper 112 in response to an instruction or command from a user (e.g., a pilot).

In some examples, it may be desirable to keep the first and second active materials 602, 606 in the secondary shape, such as when the UAV 100 intendeds to subsequently grasp the same object again or another object having a similar shape. As long as the active materials 602, 606 are not heated above the threshold temperature, the first and second active materials 602, 606 retain the secondary shape. In other examples, it may be desirable to return the first and second active materials 602, 606 back to their primary shapes. At block 1116, the material activator 330 again applies an activation signal to the first and second active materials 602, 606. For example, the material activator 330 may activate the heaters 308a, 308b to heat the first and second active materials 602, 606 above the threshold temperature. If the first and second active materials 602, 606 are unconstrained (e.g., the first and second active materials 602, 606 are not in contact with the object 600), the primary covalent bonds of the first and second active materials 602, 606 generate a net force that moves the first and second active materials 602, 606 back to their original, primary shapes. Then, at block 1118, the material activator 330 may reduce or eliminate the activation signal application to the active materials such as, for example, by reducing or eliminating the heat applied by the heaters 308a, 308b. Once the first and second active materials 602, 606 cool to below the threshold temperature, the first and second active materials 602, 606 re-harden in their primary shapes. After block 1118, the example process of FIG. 11 ends, or the example process may be repeated again (with the same object or a different object). While in FIG. 11 the example process is described in connection with an SMP material, in other examples, other types of active material(s) may be utilized, such as an SMA, an EAP, and/or any other material that undergoes a change in modulus in response to an activation signal. Further, while the example activation signal is described as being a change in temperature, in other examples, other activation signals may be implemented, such as application of an electric current or voltage, an ultraviolet light, a magnetic field, a mechanical loading or stressing, etc.

Figure 12:
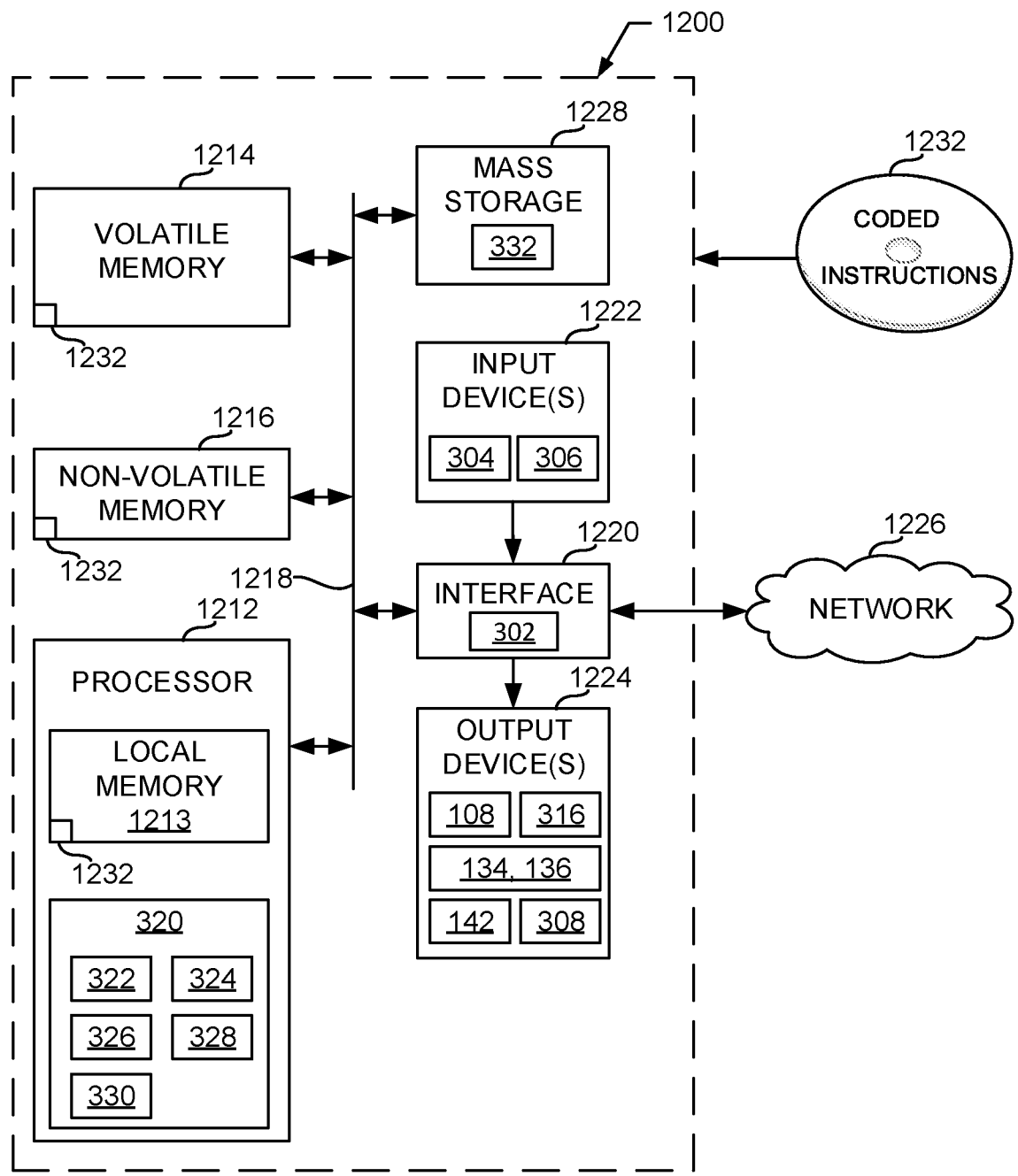
FIG. 12 is a processor platform structured to execute the example instructions of FIGS. 10 and/or 11 to implement the gripper operator of FIG. 3.

FIG. 12 is a block diagram of an example processor platform 1200 structured to execute the instructions of FIGS. 10 and/or 11 to implement the example gripper operator 320 of FIG. 3. The processor platform 1200 can be, for example, a printed circuit board, an aircraft (e.g., a UAV), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the processor 310. The processor 1212 also implements the example arm controller(s) 322, the example gripper controller 324, the example UAV system manger 326, the example object detector 328, the example material activator 330, and/or, more generally, the example gripper operator 320.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) another device and/or a user to enter data and/or commands into the processor 1212. In this example, the input device(s) 1222 may include the camera system 304 and/or the sensor system 306. Additionally or alternatively, the input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. In this example, the output device(s) 1224 may include the motors 108 and/or the motor controller(s) 316, the arm actuators 134, 136, the gripper actuator 142, and/or the heaters 308. Additionally or alternatively, the output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, may include a graphics driver card, a graphics driver chip and/or a graphics driver processor.

The interface circuit 1220 of the illustrated example also includes a communication device such as a transmitter, a receiver, a transceiver (e.g., the transceiver 302), a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In this example, the mass storage 1228 may include, for example, the memory 332.

The coded instructions 1232 of FIGS. 10 and/or 11 may be stored in the mass storage device 1228, in the volatile memory 1214, in the non-volatile memory 1216, and/or on a removable tangible computer readable storage medium such as a CD or DVD.

From the foregoing, it will be appreciated that example methods, apparatus, and articles of manufacture have been disclosed that enable a UAV to conserve energy by attaching to a structure for a period of time and deactivating one or more systems of the UAV that would normally require significant energy to operate. Thus, example UAVs disclosed herein can operate for longer periods of time. Also disclosed herein are example grippers having example active materials that enable the gripper to conform to the shape of the object being grasped. As such, example grippers disclosed herein achieve better gripping capabilities for grasping objects, such as for stabilizing the UAV while perching on an object, carrying an object, and/or in the case where the object is a port, for transferring material through the port with reduced or no leakage.

Example methods, apparatus, and articles of manufacture to grasp an object with an unmanned aerial vehicle are disclosed herein. Further examples and combinations thereof include the following:

Example 1 includes an unmanned aerial vehicle (UAV) including a gripper. The gripper includes a claw to grasp onto an object and an active material disposed on the claw. The example UAV also includes a material activator to: (1) apply an activation signal to the active material to soften the active material while the claw grasps the object with the active material, and (2) allow the active material to harden in a shape substantially matching a surface of the object.

Example 2 includes the UAV of Example 1, wherein the active material is a shape-memory polymer (SMP) material.

Example 3 includes the UAV of Example 2, wherein the activation signal is heat, and the material activator is to apply the activation signal by heating the SMP material to a temperature above a glass transition temperature $T_g$ of the SMP material.

Example 4 includes the UAV of Example 3, wherein the material activator is to allow the active material to harden by allowing the temperature of the SMP material to fall below the glass transition temperature $T_g$.

Example 5 includes the UAV of Example 3, further including a heater disposed in or near the SMP material, the material activator to control the heater.

Example 6 includes the UAV of Example 2, wherein the SMP material includes at least one of polyether ether ketone (PEEK), polyethylene terephthalate (PET), poly(methyl methacrylate) (PMMA), trimethylolpropane triacrylate (TMPTA), or isobornyl methacrylate (MA/IBoA).

Example 7 includes the UAV of Example 2, wherein the shape substantially matching the surface of the object is a secondary shape of the SMP material, and the SMP material has a primary shape, the secondary shape being different than the primary shape.

Example 8 includes the UAV of Example 7, wherein after the gripper releases the object, the material activator is to apply the activation signal to the SMP material to return the SMP material to the primary shape.

Example 9 includes the UAV of any of Examples 1-8, wherein the claw is a first claw, the gripper includes a second claw, and the first and second claws are cooperatively moveable in opposite directions to grasp the object.

Example 10 includes the UAV of Example 9, wherein the active material is a first active material, and further including a second active material coupled to an inner surface of the second claw.

Example 11 includes the UAV of any of Examples 1-8, further including a moveable arm extending from a body of the UAV, the gripper coupled to an end of the arm.

Example 12 includes the UAV of Example 11, wherein the arm includes a first arm link rotatably coupled to the body of the UAV and a second arm link rotatably coupled to an end of the first arm link, the gripper coupled to an end of the second arm link.

Example 13 includes the UAV of any of Examples 1-8, further including a system manager to, while the gripper is attached to the object, deactivate one or more systems of the UAV to conserve power.

Example 14 includes a method to grasp an object with an unmanned aerial vehicle (UAV). The method includes heating, by executing an instruction with at least one processor, an active material carried by a gripper, closing, by executing an instruction with the at least one processor, the gripper onto the object while the active material is above a threshold temperature, and reducing a temperature of the active material while the gripper is closed on the object.

Example 15 includes the method of Example 14, wherein the closing of the gripper while the active material is above the threshold temperature causes the active material to conform to a contour of the object.

Example 16 includes the method of Example 15, wherein the reducing of the temperature causes the active material to harden while retaining the contour of the object.

Example 17 includes the method of Example 14, wherein the heating of the active material includes activating a heater disposed in or near the active material.

Example 18 includes the method of Example 14, further including, after reducing the temperature of the active material, deactivating, by executing an instruction with the at least one processor, one or more systems of the UAV.

Example 19 includes the method of Example 14, further including locking, by executing an instruction with the at least one processor, the gripper in a closed position to support the UAV on the object.

Example 20 includes the method of any of Examples 14-19, wherein the active material is a shape-memory polymer (SMP) material.

Example 21 includes the method of Example 20, wherein the SMP material includes at least one of polyether ether ketone (PEEK), polyethylene terephthalate (PET), poly(methyl methacrylate) (PMMA), trimethylolpropane triacrylate (TMPTA), or isobornyl methacrylate (MA/IBoA).

Example 22 includes the method of Example 20, wherein the threshold temperature is a glass transition temperature $T_g$ of the SMP material.

Example 23 includes a non-transitory machine readable storage medium including instructions that, when executed, cause at least one machine to at least apply an activation signal to an active material, the active material disposed on a gripper carried on an unmanned aerial vehicle (UAV), close the gripper onto an object such that the active material is engaged with the object, and reduce the activation signal after the gripper is closed onto the object.

Example 24 includes the non-transitory machine readable storage medium of Example 23, wherein the instructions, when executed, cause the at least one machine to apply the activation signal by heating the active material to a temperature above a glass transition temperature $T_g$ of the active material.

Example 25 includes the non-transitory machine readable storage medium of Example 24, wherein the active material is a shape-memory polymer (SMP) material including at least one of polyether ether ketone (PEEK), polyethylene terephthalate (PET), poly(methyl methacrylate) (PMMA), trimethylolpropane triacrylate (TMPTA), or isobornyl methacrylate (MA/IBoA).

Example 26 incudes the non-transitory machine readable storage medium of Example 23, wherein the instructions, when executed, cause the at least one machine to apply the activation signal by applying a voltage or an ultraviolet light to the active material.

Example 27 includes the non-transitory machine readable storage medium of any of Examples 23-26, wherein applying the activation signal to the active material causes the active material to transition from a first state having a first modulus of elasticity to a second state having a second modulus of elasticity, the second modulus of elasticity lower than the first modulus of elasticity.

Example 28 includes the non-transitory machine readable storage medium of any of Examples 23-26, wherein the instructions, when executed, further cause the at least one machine to open the gripper to release the object, and, after the gripper is opened, apply the activation signal to the active material.

Example 29 includes the non-transitory machine readable storage medium of any of Examples 23-26, wherein the instructions, when executed, further cause the at least one machine to, after closing the gripper onto the object, cease power to one or more rotor blade motors of the UAV.

Example 30 includes an apparatus including means for applying an activation signal to an active material, the active material disposed on a gripper carried on an unmanned aerial vehicle (UAV), means for closing the gripper onto an object such that the active material is engaged with the object, and means for reducing the activation signal after the gripper is closed onto the object.

Example 31 includes the apparatus of Example 30, wherein the means for applying the activation is signal is to apply the activation signal by heating the active material to a temperature above a glass transition temperature $T_g$ of the active material.

Example 32 includes the apparatus of Example 31, wherein the active material is a shape-memory polymer (SMP) material including at least one of polyether ether ketone (PEEK), polyethylene terephthalate (PET), poly(methyl methacrylate) (PMMA), trimethylolpropane triacrylate (TMPTA), or isobornyl methacrylate (MA/IBoA).

Example 33 includes the apparatus of Example 30, wherein the means for applying the activation is signal is to apply the activation signal by applying a voltage or an ultraviolet light to the active material.

Example 34 includes the apparatus of any of Examples 30-33, wherein applying the activation signal to the active material causes the active material to transition from a first state having a first modulus of elasticity to a second state having a second modulus of elasticity, the second modulus of elasticity lower than the first modulus of elasticity.

Example 35 includes the apparatus of any of Examples 30-33, wherein the means for closing the gripper is to open the gripper to release the object and, after the gripper is opened, the means for applying the activation signal is to subsequently apply the activation signal to the active material.

Example 36 includes the apparatus of any of Examples 30-33, further including means for ceasing power to one or more rotor blade motors of the UAV after the gripper is closed on the object.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An unmanned aerial vehicle (UAV) comprising:
    a gripper including:
        a first claw and a second claw to grasp onto an object;
        a first active material disposed on the first claw; and
        a second active material disposed on the second claw; and
    a material activator to: (1) apply an activation signal to the first active material to soften the first active material while the first claw grasps the object with the first active material, and (2) allow the first active material to harden in a shape at least partially conforming to a contour of the object.

2. The UAV of claim 1, wherein the first active material is a shape-memory polymer (SMP) material.

3. The UAV of claim 2, wherein the activation signal is heat, and the material activator is to apply the activation signal by heating the SMP material to a temperature above a glass transition temperature $T_g$ of the SMP material.

4. The UAV of claim 3, wherein the material activator is to allow the first active material to harden by allowing the temperature of the SMP material to fall below the glass transition temperature $T_g$.

5. The UAV of claim 3, further including a heater disposed in or near the SMP material, the material activator to control the heater.

6. The UAV of claim 2, wherein the SMP material includes at least one of polyether ether ketone (PEEK), polyethylene terephthalate (PET), poly(methyl methacrylate) (PMMA), trimethylolpropane triacrylate (TMPTA), or isobornyl methacrylate (MA/IBoA).

7. The UAV of claim 1, wherein the first and second claws are cooperatively moveable in opposite directions to grasp the object.

8. The UAV of claim 7, wherein the first active material is coupled to an inner surface of the first claw, and the second active material is coupled to an inner surface of the second claw.

9. The UAV of claim 1, further including a moveable arm extending from a body of the UAV, the gripper coupled to an end of the arm.

10. The UAV of claim 1, further including a system manager to, while the gripper is attached to the object, deactivate one or more systems of the UAV to conserve power.

11. A method to grasp an object with an unmanned aerial vehicle (UAV), the method comprising:
    heating, by executing an instruction with at least one processor, an active material carried by a gripper;
    closing, by executing an instruction with the at least one processor, the gripper onto the object while the active material is above a threshold temperature, the active material having a loop shape when the gripper is closed; and
    reducing a temperature of the active material while the gripper is closed on the object.

12. The method of claim 11, wherein the closing of the gripper while the active material is above the threshold temperature causes the active material to conform to a contour of the object.

13. The method of claim 12, wherein the reducing of the temperature causes the active material to harden while retaining the contour of the object.

14. The method of claim 11, further including, after reducing the temperature of the active material, deactivating, by executing an instruction with the at least one processor, one or more systems of the UAV.

15. A non-transitory machine readable storage medium comprising instructions that, when executed, cause at least one machine to at least:
    apply an activation signal to an active material, the active material disposed on a gripper carried on an unmanned aerial vehicle (UAV);
    close the gripper onto an object such that the active material is engaged with the object, the active material forming a ring shape when the gripper is closed; and
    reduce the activation signal after the gripper is closed onto the object.

16. The non-transitory machine readable storage medium of claim 15, wherein the instructions, when executed, cause the at least one machine to apply the activation signal by heating the active material to a temperature above a glass transition temperature $T_g$ of the active material.

17. The non-transitory machine readable storage medium of claim 15, wherein the instructions, when executed, cause the at least one machine to apply the activation signal by applying a voltage or an ultraviolet light to the active material.

18. The non-transitory machine readable storage medium of claim 15, wherein the instructions cause the at least one machine to apply the activation signal to the active material to cause the active material to transition from a first state having a first modulus of elasticity to a second state having a second modulus of elasticity, the second modulus of elasticity lower than the first modulus of elasticity.

19. The non-transitory machine readable storage medium of claim 15, wherein the instructions, when executed, further cause the at least one machine to:
   open the gripper to release the object; and
   after the gripper is opened, apply the activation signal to the active material.

20. The non-transitory machine readable storage medium of claim 15, wherein the instructions, when executed, further cause the at least one machine to:
   after closing the gripper onto the object, cease power to one or more rotor blade motors of the UAV.

\* \* \* \* \*